US 8,612,273 B2
Dec. 17, 2013

(12) United States Patent
Johnson

(10) Patent No.: US 8,612,273 B2
(45) Date of Patent: Dec. 17, 2013

(54) METHOD AND SYSTEM FOR MANAGING VEHICLE TRAVEL

(75) Inventor: Ryan Sven Johnson, St Louis, MO (US)

(73) Assignee: The Crawford Group, Inc., St. Louis, MO (US)

( * ) Notice: Subject to any disclaimer, the term of this patent is extended or adjusted under 35 U.S.C. 154(b) by 463 days.

(21) Appl. No.: 12/752,903

(22) Filed: Apr. 1, 2010

(65) Prior Publication Data
US 2011/0246246 A1 Oct. 6, 2011

(51) Int. Cl.
G06Q 10/00 (2012.01)
G06F 17/00 (2006.01)

(52) U.S. Cl.
USPC .................. 705/7.11; 705/400; 705/307

(58) Field of Classification Search
USPC .......... 705/5, 6, 7.11, 307, 400, 1.1; 701/400, 701/532, 533, 410, 420, 425, 432; 703/8; 715/771; 706/47, 59
See application file for complete search history.

(56) References Cited

U.S. PATENT DOCUMENTS

| | | |
|---|---|---|
| 3,665,397 A | 5/1972 | Di Napoli et al. |
| 5,289,369 A | 2/1994 | Hirshberg |
| 5,533,097 A | 7/1996 | Crane et al. |
| 5,726,885 A | 3/1998 | Klein et al. |
| 5,812,070 A | 9/1998 | Tagami et al. |
| 5,832,451 A | 11/1998 | Flake et al. |
| 5,835,376 A | 11/1998 | Smith et al. |
| 5,892,905 A | 4/1999 | Brandt et al. |
| 5,897,620 A | 4/1999 | Walker et al. |
| 5,945,919 A | 8/1999 | Trask |
| 5,948,040 A | 9/1999 | DeLorme et al. |
| 6,023,679 A | 2/2000 | Acebo et al. |
| 6,181,991 B1 | 1/2001 | Kondo et al. |
| 6,185,487 B1 | 2/2001 | Kondo et al. |
| 6,225,890 B1 | 5/2001 | Murphy |
| 6,240,365 B1 | 5/2001 | Bunn |
| 6,356,836 B1 | 3/2002 | Adolph |
| 6,430,496 B1 | 8/2002 | Smith et al. |
| 6,477,503 B1 | 11/2002 | Mankes |
| 6,539,424 B1 | 3/2003 | Dutta |
| 6,618,650 B1 | 9/2003 | Nakai et al. |
| 6,636,145 B1 | 10/2003 | Murakami et al. |
| 6,657,556 B2 | 12/2003 | Ogura et al. |
| 6,694,248 B2 | 2/2004 | Smith et al. |

(Continued)

FOREIGN PATENT DOCUMENTS

| | | |
|---|---|---|
| WO | 9717680 | 5/1997 |
| WO | 0052601 | 9/2000 |

OTHER PUBLICATIONS

"First Route Planning Software with Emissions Calculator", from PTV website, http://www.ptvag.com/company/news/press/press-release/pressrelease/first-route-planning-software-with-emissions-calculator/?tx_ptvnews_pi1%5Bpage%5D=7, Jan. 13, 2009.
Office Action for U.S. Appl. No. 13/033,913 dated Aug. 19, 2011.

(Continued)

Primary Examiner — Igor Borissov
(74) Attorney, Agent, or Firm — Thompson Coburn LLP

(57) ABSTRACT

Methods and systems for facilitating efficient travel management are disclosed. Exemplary embodiments comprise a processor configured to make selections from among a plurality of vehicle travel modes based on a vehicle travel mode selection rule using, at least in part, received travel plan information. In a preferred embodiment, this selection can be based on any of a number of factors, including monetary costs and carbon emissions associated with different vehicle travel mode options.

67 Claims, 34 Drawing Sheets

(56) References Cited

U.S. PATENT DOCUMENTS

| | | | |
|---|---|---|---|
| 6,696,981 | B1 | 2/2004 | Hashimoto et al. |
| 6,697,730 | B2 | 2/2004 | Dickerson |
| 6,850,153 | B1 | 2/2005 | Murakami et al. |
| 6,850,898 | B1 | 2/2005 | Murakami et al. |
| 6,859,009 | B2 | 2/2005 | Jablin |
| 6,898,493 | B2 | 5/2005 | Ehrman et al. |
| 6,931,308 | B2 | 8/2005 | Read |
| 6,941,197 | B1 | 9/2005 | Murakami et al. |
| 6,947,881 | B1 | 9/2005 | Murakami et al. |
| 6,952,680 | B1 | 10/2005 | Melby et al. |
| 6,965,323 | B2 | 11/2005 | Uehara et al. |
| 6,975,997 | B1 | 12/2005 | Murakami et al. |
| 7,050,986 | B1 | 5/2006 | Vance et al. |
| 7,062,376 | B2 | 6/2006 | Oesterling |
| 7,091,882 | B2 | 8/2006 | Doyle |
| 7,113,864 | B2 | 9/2006 | Smith et al. |
| 7,181,409 | B1 | 2/2007 | Murakami et al. |
| 7,188,070 | B2 | 3/2007 | Dar et al. |
| 7,271,701 | B2 | 9/2007 | Kokubu et al. |
| 2001/0056361 | A1 | 12/2001 | Sendouda |
| 2001/0056363 | A1 | 12/2001 | Gantz et al. |
| 2002/0007291 | A1 | 1/2002 | Miller et al. |
| 2002/0022979 | A1 | 2/2002 | Whipp et al. |
| 2002/0026337 | A1 | 2/2002 | Sasaki |
| 2002/0065688 | A1 | 5/2002 | Charlton et al. |
| 2002/0072963 | A1 | 6/2002 | Jonge |
| 2002/0077871 | A1 | 6/2002 | Udelhoven et al. |
| 2002/0156553 | A1 | 10/2002 | Read |
| 2002/0186144 | A1 | 12/2002 | Meunier |
| 2003/0033175 | A1 | 2/2003 | Ogura et al. |
| 2003/0034873 | A1 | 2/2003 | Chase et al. |
| 2003/0040944 | A1 | 2/2003 | Hileman |
| 2003/0090363 | A1 | 5/2003 | Ogura et al. |
| 2003/0120522 | A1 | 6/2003 | Uyeki |
| 2003/0149617 | A1 | 8/2003 | Kobayashi |
| 2004/0006498 | A1 | 1/2004 | Ohtake et al. |
| 2004/0010338 | A1 | 1/2004 | Ogura et al. |
| 2004/0044592 | A1 | 3/2004 | Ubik et al. |
| 2004/0054561 | A1 | 3/2004 | Ogura et al. |
| 2004/0073440 | A1 | 4/2004 | Garbers et al. |
| 2004/0122561 | A1 | 6/2004 | Fujinuma et al. |
| 2004/0158483 | A1 | 8/2004 | Lecouturier |
| 2004/0176969 | A1 | 9/2004 | Fujinuma |
| 2004/0260470 | A1 | 12/2004 | Rast |
| 2005/0091087 | A1 | 4/2005 | Smith et al. |
| 2005/0099320 | A1 | 5/2005 | Nath et al. |
| 2005/0108089 | A1 | 5/2005 | Ehrman et al. |
| 2005/0182671 | A1 | 8/2005 | Miyauchi |
| 2005/0206502 | A1 | 9/2005 | Bernitz |
| 2005/0216296 | A1 | 9/2005 | Kokubu |
| 2005/0256762 | A1 | 11/2005 | Dar et al. |
| 2006/0136291 | A1 | 6/2006 | Morita et al. |
| 2006/0265117 | A1 | 11/2006 | Cahoon |
| 2007/0027708 | A1 | 2/2007 | Brown et al. |
| 2007/0073562 | A1 | 3/2007 | Brice et al. |
| 2007/0094055 | A1 | 4/2007 | Nakayama et al. |
| 2007/0179819 | A1 | 8/2007 | Bradley et al. |
| 2008/0091342 | A1 | 4/2008 | Assael |
| 2009/0287408 | A1 | 11/2009 | Gerdes et al. |
| 2010/0077020 | A1 | 3/2010 | Paloheimo et al. |
| 2011/0137691 | A1 | 6/2011 | Johnson |
| 2011/0144963 | A1 | 6/2011 | Johnson |
| 2011/0145089 | A1 | 6/2011 | Khunger et al. |
| 2011/0208551 | A1 | 8/2011 | Johnson |

OTHER PUBLICATIONS

"Carbon Footprint Calculator & Calculator Methodology", from www.terrapass.com/carbon-footprint-calculator/ and www.terrapass.com/carbon-footprint-calculator/methodology-popup.html, 5 pages, accessed on Jun. 29, 2011.
Archived version of "Carbon Footprint Calculator" & "Calculator Methodology" from Internet Archive Wayback Machine for Feb. 16, 2009 and Jan. 31, 2009, 5 pages.
"Fuel Economy", from www.fueleconomy.gov/, 1 page, accessed on Jun. 29, 2011.
Archived version of "www.fueleconomy.gov" from Internet Archive Wayback Machine for Mar. 28, 2009, 1 page.
Archived Version of http://goloco.org from Internet Archive Wayback Machine dated Feb. 26, 2008, downloaded from http://web.archive.org on Jan. 14, 2010, 12 pages.
Archived Version of http://www.zimride.com from Internet Archive Wayback Machine dated Apr. 4, 2008, downloaded from http://web.archive.org on Jan. 14, 2010, 10 pages.
Demonte, "EcoWeb Tool: Facebook's Carpool App", Jul. 24, 2007, downloaded from Internet on Jan. 14, 2010, 4 pages.
Enterprise Fleet Management Services, downloaded from http://www.enterprise.com/fleets/Services.action on Jan. 8, 2010, 13 pages.
Enterprise Fleet Management Solutions, downloaded from http://www.enterprise.com/fleets/Solutions.action on Jan. 8, 2010, 1 page.
Enterprise Rent-A-Car: Business Car Rental & Long-term Corporate Car Rental, downloaded from http://www.enterprise.com/car_rental/corporateClassIntro.do on Jan. 8, 2010, 2 pages.
Holahan, "Help Just a Click Away", BusinessWeek, Feb. 14, 2008, downloaded from Internet on Jan. 14, 2010, 2 pages.
Keys to Green: Enterprise, National, Alamo—Our Comprehensive Environmental Platform, downloaded from http://fleet.keystogreen.com/ on Jan. 8, 2010, 7 pages.
Nicole, "Zimride Launches Carpooling Network for Facebook", Apr. 15, 2007, downloaded from Internet on Jan. 14, 2010, 3 pages.
Rental vs Employee Reimbursement Calculator, downloaded from http://www.enterprise.com/car_rental/mileageCalculator.do on Jan. 8, 2010, 2 pages.
Sparkes, "Carpool With Facebook", Jul. 2, 2007, downloaded from Internet on Jan. 14, 2010, 2 pages.
Thomas, "Electronic Hitchhiking Greens Up the Daily Commute", Dec. 8, 2009, downloaded from Internet on Jan. 14, 2010, 3 pages.
Website pages from http://www.goloco.org, downloaded on Jan. 14, 2010, 11 pages.
Website pages from http://www.zimride.com, downloaded on Jan. 14, 2010, 31 pages.
Yip, "Arrange for a Ride Using Your Facebook", Imprint Online, Jul. 13, 2007, vol. 30, Issue 6, downloaded from Internet on Jan. 14, 2010, 3 pages.
Response to Office Action for U.S. Appl. No. 13/033,913 dated Aug. 19, 2011.
"Motor Vehicle Emissions Simulator (MOVES) 2010 User Guide", Assessment and Standards Division, Office of Transportation and Air Quality, U.S. Environmental Protection Agency, Dec. 2009.
Office Action for U.S. Appl. No. 12/752,821 dated Jun. 29, 2012.
Office Action for U.S. Appl. No. 13/033,913 dated Oct. 4, 2012.
Response to Office Action for U.S. Appl. No. 12/752,821 dated Jun. 29, 2012.
Office Action for U.S. Appl. No. 12/752,821 dated Mar. 14, 2013.
Response to Office Action for U.S. Appl. No. 12/752,821 dated Mar. 14, 2013.
Office Action for U.S. Appl. No. 13/033883 dated Sep. 24, 2013.

Meeting Subject: [ ... ]

Meeting Location:

Enter Address: [ ... ]

or

Select from List: [ ... ▽ ]

Your Location:

Enter Address: [ ... ]

or

Select from List: [ Office ▽ ]

Round Trip? Yes [⊠] No [ ]

⎫
⎬ 220
⎭

Start Date: [ ... ]

Start Time: [ ... ]

End Date: [ ... ]

End Time: [ ... ]

[ *Clear* ] [ *Continue* ]

Figure 2C

USERS 390

| User_ID 300 | Name 301 | Level 302 | Personal_Vehicle 303 | Friends_List 304 | Default_Locations 305 | Contact 306 |
|---|---|---|---|---|---|---|
| A | Alice | L2 | V1 | B, C | 9:00 am – 5:00 pm: Q | 555-555-5551 Alice@acme.com |
| B | Bob | L2 | V2 | A, C | 9:00 am – 5:00 pm: Q | 555-555-5552 Bob@acme.com |
| C | Cindy | L3 | V3 | A, B | 9:00 am – 5:00 pm: Q, 5:01 pm – 8:59 am: R | 555-555-5553 Cindy@acme.com |
| D | David | L3 | - | - | 9:00 am – 5:00 pm: S | 555-555-5554 David@acme.com |

Figure 3A

DESIGNATED USER GROUPS 391

| DUG_ID 307 | Level_IDs 308 |
|---|---|
| D1 | L1 |
| D2 | L2, L3 |

Figure 3B

VEHICLES 392

| Vehicle_ID 310 | Owner_ID 311 | Type 312 | Location 313 | Capacity 314 | Make 315 | Model 316 | CO2 (g/mile) 317 | Cost 318 |
|---|---|---|---|---|---|---|---|---|
| V1 | A | Personal | Same as Alice | 4 | Honda | Accord | 150 | $0.60/mile |
| V2 | B | Personal | Same as Bob | 5 | Toyota | Tacoma | 300 | $0.60/mile |
| V3 | C | Personal | Same as Cindy | 4 | Ford | Mustang | 250 | $0.60/mile |
| V4 | ACME | Fleet | Q | 2 | Cooper | Mini | 60 | $0.20/mile |
| V5 | ACME | Fleet | Q | 4 | Honda | Civic | 100 | $0.25/mile |
| V6 | Enterprise | Daily Rental | R | 4 | Toyota | Prius | 50 | $40/day $0.10/mile |
| V7 | Enterprise | Daily Rental | Q | 4 | Toyota | Prius | 50 | $40/day $0.10/mile |

Figure 3C

LEVELS 393

| Level 320 | Ridesharing Decline Authority 321 | Vehicle Decline Authority 322 | Travel Routes 323 | Modify Suggestion Authority 324 | Time Value 325 | Time Threshold 326 |
|---|---|---|---|---|---|---|
| L1 | No | No | No | No | 1 | 1:00 |
| L2 | No | No | No | No | 10 | 0:30 |
| L3 | Yes | Yes | Yes | Yes | 20 | 0:20 |

Figure 3D

LOCATIONS 394

| Location_ID 330 | Description 331 | Address 332 | Latitude 333 | Longitude 334 |
|---|---|---|---|---|
| Q | ACME Home Office | 600 Corporate Park Drive, 63105 | 38.643104 | -90.345705 |
| R | Cindy's Home | 123 Fake Street, 63126 | 38.571309 | -90.383211 |
| S | ACME Satellite Office | 345 Suburban Drive, 63123 | 38.662494 | -90.478549 |

Figure 3E

TRAVEL PLANS 395

| Plan_ID 340 | User_ID 341 | Origin 342 | Destination 1 343 | Date/Time 1 344 | Destination 2 345 | Date/Time 2 346 |
|---|---|---|---|---|---|---|
| P1 | A | Office Q | Office S | 1/14/2010, 3:00 pm | Office Q | 1/14/2010, 4:30 pm |
| P2 | B | Office Q | Office S | 1/14/2010, 3:00 pm | Office Q | 1/14/2010, 4:30 pm |
| P3 | C | Cindy's Home R | Office S | 1/14/2010, 3:15 pm | Cindy's Home R | 1/14/2010, 4:15 pm |

Figure 3F

RIDE-SHARE GROUPS 396

| Group_ID 347 | Plan_IDs 348 |
|---|---|
| G1 | P1, P2, P3 |

Figure 3G

TRAVEL ROUTES 397

| Route_ID 350 | User_IDs 352 | Origin 353 | Destination 354 | Date/Time 355 | Distance 356 | Status 357 |
|---|---|---|---|---|---|---|
| R1 | C | R | Q | mm/dd/yyyy hh:mm | 20 | |
| R2 | A, B, C | Q | S | mm/dd/yyyy hh:mm | 30 | |
| R3 | A, B, C | S | Q | mm/dd/yyyy hh:mm | 30 | |
| R4 | C | Q | R | mm/dd/yyyy hh:mm | 20 | |
| R5 | A, B | Q | R | mm/dd/yyyy hh:mm | 20 | Confirmed |
| R6 | A, B, C | R | S | mm/dd/yyyy hh:mm | 20 | Confirmed |
| R7 | A, B, C | S | R | mm/dd/yyyy hh:mm | 20 | Confirmed |
| R8 | A, B | R | Q | mm/dd/yyyy hh:mm | 20 | Confirmed |
| R9 | C | R | S | mm/dd/yyyy hh:mm | 20 | |
| R10 | C | S | R | mm/dd/yyyy hh:mm | 20 | |
| R11 | A, B | Q | S | mm/dd/yyyy hh:mm | 30 | |

Figure 3H

TRAVEL OPTIONS 398

| Option_ID 360 | Plan_IDs 361 | Route_IDs 362 | Vehicle_ID 363 | Cost 364 | CO2 (kg) 365 | Distance 366 | Emp. Time 367 | Weighted 368 | Status 369 |
|---|---|---|---|---|---|---|---|---|---|
| O1 | P1, P2, P3 | R1, R2, R3, R4 | V3 | 60 | 25 | 100 | 3200 | 1045 | |
| O2 | P1, P2, P3 | R1, R2, R3, R4 | V6 | 50 | 5 | 100 | 3200 | 845 | |
| O3 | P1, P2, P3 | R5, R6, R7, R8 | V1 | 48 | 12 | 80 | 2400 | 780 | |
| O4 | P1, P2, P3 | R5, R6, R7, R8 | V2 | 48 | 24 | 80 | 2400 | 840 | |
| O5 | P1, P2, P3 | R5, R6, R7, R8 | V5 | 20 | 8 | 80 | 2400 | 480 | Confirmed |
| O6 | P1, P2, P3 | R5, R6, R7, R8 | V6 | 48 | 4 | 80 | 2400 | 640 | |

Figure 3I

TRAVEL SOLUTIONS 399

| Solution_ID 370 | Plan_IDs 371 | Route_IDs 372 | Vehicle_ID 373 | Cost 374 | CO2 (kg) 375 | Distance 376 | Emp. Time 377 | Weighted 378 | Status 379 |
|---|---|---|---|---|---|---|---|---|---|
| S1 | P1, P2, P3 | R5, R6, R7, R8 | V5 | 20 | 8 | 80 | 2400 | 480 | Confirmed |
| S2 | P4, P5 | R12, R13 | V9 | 40 | 20 | 100 | 3000 | 600 | Completed |

Figure 3J

| SYSTEM VARIABLES 380 ||
|---|---|
| Variable_Description 381 | Value 382 |
| Ride-share distance threshold (383) | 50 mi |
| Cost multiplier (384) | 10 |
| Emissions multiplier (385) | 5 |
| Employee time multiplier (386) | 0.1 |
| Personal vehicle multiplier (387) | 1 |
| Time Cut-off (388) | 24 hours |

Figure 3K

User: Alice

Travel Plan for: Engineering Meeting with David and Bob
Date: January 14
Time: 3:00 pm – 4:30 pm
Location: S Origin: | Corporate Office Q Depart time 1: | 2:15 pm Destination 1: | Satellite Office S Round-trip? ☑

Depart time 2: | 4:45 pm

Destination 2: | Corporate Office Q

+ Add destination

Vehicle: | Alice's personal vehicle

Driver: | Alice

Additional Travelers

| Name | Pick-up Location: |
| --- | --- |
|  |  |
|  |  |

User: Bob

Travel Plan for: Engineering Meeting with David and Alice
Date: January 14
Time: 3:00 pm – 4:30 pm
Location: S

| | | |
|---|---|---|
| Origin: | Corporate Office Q ▽ | |
| Depart time 1: | 2:15 pm ▽ | Round-trip? ✓ |
| Destination 1: | Satellite Office S ▽ | |
| Depart time 2: | 4:45 pm ▽ | |
| Destination 2: | Corporate Office Q ▽ | |

+ Add destination

Vehicle: Bob's personal vehicle ▽

Driver: Bob ▽

Additional Travelers

| Name | Pick-up Location: |
|---|---|
| ▽ | ▽ |
| ▽ | ▽ |

Figure 6B

User: Cindy

Travel Plan for: Marketing Meeting with Fred
Date: January 14
Time: 3:15 pm – 4:15 pm
Location: S

| | | |
|---|---|---|
| Origin: | Corporate Office Q ▽ | |
| Depart time 1: | 2:30 pm ▽ | Round-trip?  ☑ |
| Destination 1: | Satellite Office S ▽ | |
| Depart time 2: | 4:30 pm ▽ | |
| Destination 2: | Corporate Office Q ▽ | |

+ Add destination

Vehicle: Cindy's personal vehicle ▽

Driver: Cindy ▽

Additional Travelers

| Name | Pick-up Location: |
|---|---|
| ▽ | ▽ |
| ▽ | ▽ |

Figure 6C

User: Cindy

Travel Plan for: Marketing Meeting with Fred
Date: January 14
Time: 3:15 pm – 4:15 pm
Location: S

| | | |
|---|---|---|
| Origin: | Cindy's Home R ▽ | |
| Depart time 1: | 2:40 pm ▽ | Round-trip? ☑ |
| Destination 1: | Satellite Office S ▽ | |
| Depart time 2: | 4:30 pm ▽ | |
| Destination 2: | Cindy's Home R ▽ | |

+ Add destination

Vehicle: Cindy's personal vehicle ▽

Driver: Cindy ▽

Additional Travelers

| Name | Pick-up Location: |
|---|---|
| ▽ | ▽ |
| ▽ | ▽ |

Figure 6D

User: Cindy
Travel Suggestion for: Marketing Meeting with Fred
Date: January 14
Time: 3:15 pm – 4:15 pm
Location: S
Origin: Corporate Office Q 
Depart time 1: 2:00 pm 
Destination 1: Cindy's Home R 
Round-trip? ☑
Depart time 2: 2:30 pm 
Destination 2: Satellite Office S 
Depart time 1: 4:45 pm 
Destination 1: Cindy's Home R 
Depart time 2: 5:15 pm 
Destination 2: Corporate Office Q 
+ Add destination
Figure 6E1

Vehicle: | Rental Vehicle  |
Driver: | Alice  |
Additional Travelers
Name | Pick-up Location:
| Bob  | Corporate Office Q  |
| Cindy  | Cindy's Home R  |
Remove me from this travel option
Figure 6E2

ACME CORPORATION
TRAVEL MANAGEMENT SYSTEM REPORT

REPORT TYPE: EFFICIENCY REPORT
TIME PERIOD: January 1, 2009 – January 31, 2009

| | Total Cost ($) 901 | Total Emissions (kg) 903 | Total Employee Time (thousands) 905 | Total Distance (miles) 909 | Total Weighted Value 907 |
|---|---|---|---|---|---|
| Actual | 32,520 | 14,198 | 2,310 | 70,432 | 627,190 |
| Suggested | 11,450 | 9,930 | 2,950 | 50,124 | 559,150 |
| Worst-case | 52,329 | 25,315 | 1,826 | 92,065 | 832,465 |

| | Average Cost ($) per mile 911 | Average Emissions (kg) per mile 913 | Average Employee Time (thousands) per mile 915 | Average Weighted Value per mile 917 |
|---|---|---|---|---|
| Actual | 0.462 | 0.202 | 0.033 | 8.905 |
| Suggested | 0.428 | 0.198 | 0.059 | 11.155 |
| Worst-case | 0.56 | 0.275 | 0.019 | 9.042 |

Figure 9A

ACME CORPORATION
TRAVEL MANAGEMENT SYSTEM REPORT

REPORT TYPE: WEIGHTED VALUE COMPARISON
TIME PERIOD: January 1, 2009 – January 31, 2009

|  | Actual | Suggested | Worst-case |
|---|---|---|---|
| Actual 627,190 | - | 112.17% | 75.34% |
| Suggested 559,150 | 89.15% | - | 67.17% |
| Worst-case 832,465 | 132.73% | 148.88% | - |

REPORT TYPE: EMISSIONS COMPARISON
TIME PERIOD: January 1, 2009 – January 31, 2009

|  | Actual | Suggested | Worst-case |
|---|---|---|---|
| Actual 14,198 | - | 142.98% | 56.09% |
| Suggested 9,930 | 69.94% | - | 39.23% |
| Worst-case 25,315 | 178.30% | 254.93% | - |

Figure 9B

ACME CORPORATION
TRAVEL MANAGEMENT SYSTEM REPORT

REPORT TYPE: DECLINED TRAVEL SUGGESTIONS - OVERVIEW
TIME PERIOD: January 1, 2009 – January 31, 2009

|  | Department | | | Total |
| --- | --- | --- | --- | --- |
|  | Marketing | Sales | Executive |  |
| Percent Suggestions Declined | 25 | 30 | 90 | 35 |
| Avoidable Cost (Dollars) | 4,720 | 5,987 | 10,363 | 21,070 |
| Percent Avoidable Cost | 22.4 | 28.4 | 49.2 | 100 |
| Avoidable Emissions (kg CO2) | 1,090 | 1,022 | 2,156 | 4,268 |
| Percent Avoidable Emissions | 25.5 | 24.0 | 50.5 | 100 |
| Avoidable Weighted Value | 15,837 | 19,347 | 32,856 | 68,040 |
| Percent Avoidable Weighted Value | 23.3 | 28.4 | 48.3 | 100 |

Figure 9C1

ACME CORPORATION
TRAVEL MANAGEMENT SYSTEM REPORT

REPORT TYPE: DECLINED TRAVEL SUGGESTIONS – WORST OFFENDERS
TIME PERIOD: January 1, 2009 – January 31, 2009

| User_ID | Name | Declined Suggestions |
|---------|--------|----------------------|
| H | Henry | 13 |
| G | George | 11 |
| F | Frank | 10 |
| I | Iris | 10 |
| K | Ken7 | 9 |
| L | Lenny | 8 |

Figure 9C2

ACME CORPORATION
TRAVEL MANAGEMENT SYSTEM REPORT

REPORT TYPE: SIMULATION REPORT
TIME PERIOD: January 1, 2009 – January 31, 2009

| | Total Cost ($) 901 | Total Emissions (kg) 903 | Total Employee Time (thousands) 905 | Total Distance (miles) 909 | Total Weighted Value 907 |
|---|---|---|---|---|---|
| Actual | 32,520 | 14,198 | 2,310 | 70,432 | 627,190 |
| Suggested | 11,450 | 9,930 | 2,950 | 50,124 | 559,150 |
| Worst-case | 52,329 | 25,315 | 1,826 | 92,065 | 832,465 |
| Simulation 1 | 11,520 | 9,781 | 2,950 | 50,124 | 459,105 |
| Simulation 2 | 11,220 | 9,821 | 2,950 | 50,124 | 456,305 |
| Simulation 3 | 12,812 | 9,104 | 2,763 | 49,354 | 424,316 |

Simulation 1 parameters: Add Toyota Prius to vehicle fleet
Simulation 2 parameters: Remove Ford Mustang from fleet
Simulation 3 parameters: Change cost multiplier from 10 to 8

Figure 9D

Rental vs Employee Reimbursement Calculator close window

Input Values
All fields required

Print this page

Distance to be Traveled: [       ] Miles

Total Days in Trip: [    ]

Car Rental Daily Rate: * [      ] USD

Cost of Fuel: [      ] Gal.

Reimbursement Rate: [     ] USD / Miles

Rental Car Fuel Usage: [     ] Miles / Gal.

[ Reset Calculator ]   [ Calculate Results ]

* Actual rate may vary. Additional taxes, surcharges etc. may apply

Print this page

PRIOR ART

Figure 10A

Rental vs Employee Reimbursement Calculator close window

Input Values
All fields required

Print this page

Distance to be Traveled: [100]  Miles

Total Days in Trip: [1]

Car Rental Daily Rate: * [25]  USD

Cost of Fuel: [4]  Gal.

Reimbursement Rate: [.25]  USD / Miles

Rental Car Fuel Usage: [20]  Miles / Gal.

[Reset Calculator]  [Calculate Results]

* Actual rate may vary. Additional taxes, surcharges etc. may apply

Reimbursement is less than Cost of Rental by $ 20.00 USD

Detailed Results

| Employee's Vehicle | Rental Vehicle | |
|---|---|---|
| Reimbursement: $ 25.00 USD | Vehicle Rental: | $ 25.00 USD |
| | Refueling: | $ 20.00 USD |
| | Cost of Rental: | $ 45.00 USD |

Print this page

PRIOR ART

Figure 10B

METHOD AND SYSTEM FOR MANAGING VEHICLE TRAVEL

CROSS-REFERENCE TO RELATED PATENT APPLICATION

This patent application is related to co-pending patent application Ser. No. 12/752,821, entitled "Method and System for Reducing Carbon Emissions Arising from Vehicle Travel", filed this same day, the entire disclosure of which is incorporated herein by reference.

BACKGROUND AND SUMMARY OF THE DISCLOSURE

Many employers subsidize, in some manner, their employees' car travel. For example, some employers directly pay for or reimburse their employees for rental vehicles that are rented for business purposes (e.g., traveling to meetings, etc.). As another example, many employers also reimburse their employees for mileage with respect to employees' use of their personal vehicles for business purposes (with such mileage reimbursement also reimbursing for fuel expenses). A prior art tool that permits a user to compare expected monetary costs as between travel by rental vehicle and travel by reimbursable personal vehicle has been available through the website of Enterprise. This tool is known as the "Rental vs Employee Reimbursement Calculator", as shown in FIGS. 10A and 10B. FIG. 10A is a graphical user interface (GUI) that shows user entry fields for data that the user must supply to the calculator to compare expected rental and reimbursement costs. Namely, the user needs to manually enter all of the following: (1) a distance for the trip (d), (2) the total number of days in the trip (t), (3) a daily rate for a rental vehicle ($r_1$), (4) a cost for fuel (c), (5) a reimbursement rate (in units of dollars per mile) ($r_2$), and (6) a fuel usage for a rental car (in units of miles per gallon) (f). After the user enters values in these data entry fields and selects the "Calculate Results" button, the GUI of FIG. 10B is displayed. FIG. 10B shows the same data entry fields as present in FIG. 10A (including the values entered by the user) and also includes a read-only output section that displays (1) text that identifies whether the rental vehicle or reimbursable personal vehicle has a lower cost, and (2) a comparison table that displays the expected costs for a rental vehicle and a reimbursable personal vehicle. The formulas used by the calculator for these cost calculations are as follows $$RPVC = d * r_2$$
$$RVC = (t * r_1) + \left(\frac{c * f}{d}\right)$$

wherein RPVC represents the expected cost for the reimbursable personal vehicle and wherein RVC represents the expected cost for the rental vehicle.

Furthermore, some employers also maintain a fleet of vehicles for use in a "pool" by their employees on an as needed basis (once again, for business purposes). Employer vehicle fleets may comprise employer-owned vehicles, leased vehicles, rental vehicles, or any combination thereof.

The inventors believe that a systemic and automated technique through which employers can control how their employees make use of available travel options would be a useful tool for helping employers achieve desired goals, such as controlling costs and/or reducing carbon emissions. Toward this end, the inventors disclose several embodiments of the present invention.

Thus, according to exemplary embodiments of the invention, the inventors disclose systems, methods and computer program products for managing vehicle travel. An exemplary system comprises a processor configured execute a travel management software application, the travel management software application configured to (1) receive data from a user that represents a plan to travel by vehicle, (2) determine a distance for the vehicle travel plan based at least in part on the received vehicle travel plan data, (3) retrieve vehicle travel mode data for a plurality of vehicle travel modes based at least in part on the received vehicle travel plan data, (4) process the received vehicle travel plan data based at least in part on (i) the determined distance and (ii) the retrieved vehicle travel mode data, and (5) based on the processing, select a vehicle travel mode that satisfies the vehicle travel plan and a vehicle travel mode selection rule from among a plurality of vehicle travel modes, wherein the vehicle travel modes comprise at least two members of the group consisting of a rental vehicle travel mode, a fleet vehicle travel mode and a reimbursable personal vehicle travel mode.

As used herein, the term "vehicle" refers to a road-based vehicle such as a car or truck. The term "vehicle" does not encompass modes of transportation by air or water, such as airplanes or boats. However, it should be understood that this does not mean that the travel plans encompassed by embodiments of the invention cannot include air travel or water travel as a component thereof. For example, a user's travel plan may comprise multiple legs, with a first leg being from the office to the airport, a second leg being by air from City A to City B, and a third leg from City B's airport to a meeting location. Embodiments disclosed herein can be configured to select vehicle travel options for the first and third legs based on predetermined rules as discussed below.

As used herein, the term "vehicle travel mode" refers to a manner of vehicle travel subject to a particular type of employer subsidization. Examples of vehicle travel modes include rental vehicles (wherein the employer pays for all (or a part) of the rental vehicle costs), fleet vehicles (wherein the employer pays to maintain a fleet of vehicles that are available for use by employees) and reimbursable personal vehicles (which are employees' personal vehicles for which the employer will reimburse an employee for some types of business use). As noted above, employer fleet vehicles may comprise employer-owned vehicles, leased vehicles, rental vehicles, or any combination thereof depending on the employer's needs. For example, some employers own one or more vehicles and maintain those vehicles in a pool for employee use. Some employers lease vehicles for the same purpose. Further still, some employers contract for one or more rental vehicles from a rental vehicle service provider which are in turn provisioned to employees for business travel on an as needed basis. For purposes of clarity when referring to a rental vehicle travel mode and a fleet vehicle travel mode in situations where the employer's vehicle fleet includes one or more rental vehicles, it should be understood that the rental vehicle travel mode refers to a travel mode where the subject vehicle is a vehicle rented by the employer from a rental vehicle service provider such that the rental vehicle service provider takes control over the rental vehicle as the end of a given instance of use by an employee. By contrast the fleet vehicle travel mode in this situation refers to a travel mode where the subject vehicle is a vehicle provided by a rental vehicle service provider but for which the employer controls the vehicle between periods of use by employees. With a fleet vehicle such as this, the employer typically contracts with a rental vehicle service provider for the rental vehicle service provider to provide one or more vehicles from the rental vehicle service provider's rental fleet on a long term basis where those vehicles are kept on the employer's premises to be made available to employees. Thus, while the vehicles made available to employees can be thought of as a rental vehicle in the sense that a rental vehicle service provider has rented those vehicles to the employer on a long term basis, for the purposes of this disclosure such vehicles are better referred to as fleet vehicles. For example, such vehicles represent a certain amount of "sunk cost" for the employer in that the employer is paying the rental vehicle service provider some amount for those vehicles whether or not an employee actually uses the vehicle. By contrast, with the rental vehicle travel mode, there will not be a "sunk cost" component because costs for rental vehicles within the rental vehicle travel mode are borne on an "as needed" basis.

The vehicle travel mode selection rule can be any rule that selects a vehicle travel mode from among the plurality of vehicle travel modes based on or more predetermined criteria. For example, a vehicle travel mode selection rule can be a "lowest monetary cost" rule that operates to select the vehicle travel mode having the lowest associated monetary cost. With such a rule, the data processing performed by the travel management software application would include computing the expected costs for the plurality of vehicle travel modes taking into consideration the received travel plan data. As another example, the vehicle travel mode selection rule can be a "lowest carbon emissions" rule that operates to select the vehicle travel mode having the lowest associated carbon emissions. With this rule, the data processing performed by the travel management software application would include computing the expected carbon emissions for the plurality of vehicle travel modes taking into consideration the received travel plan data. It should be noted that the vehicle travel mode selection rule could also combine cost concerns with environmental concerns by using a combination of expected costs and carbon emissions as criteria for controlling the selection process. For example, weights can be assigned to cost factors and environmental factors associated with vehicle travel mode options to arrive at a desired balance of cost and environmental considerations when selecting an appropriate vehicle travel mode.

The inventors further note their belief that a large proportion of vehicle travel involves a single person driving with no passengers, despite the fact that most vehicles accommodate 4 passengers or more. Moreover, many people traveling at any given time may share a similar, or even identical, origin and destination, particularly in corporate environments where many employees often have a need to travel to different worksites and common client/customer offices. However, the inventors believe that the frequency of ride-sharing is much lower than it could be due to a lack of any efficient mechanism to identify and alert drivers to ridesharing opportunities. Toward this end, the inventors disclose exemplary embodiments wherein the travel management software application also tracks multiple users' vehicle travel plans to identify potential ridesharing opportunities.

In additional exemplary embodiments, the system can also be configured to manage pick-up and delivery of packages by users of the system. For example, an employee may be asked (or required) to deliver a package from one corporate office to another.

Further still, in exemplary embodiments, the system can track past vehicle usage and travel plans for use in generating data indicative of various measures of system effectiveness (e.g., cost savings over time, carbon emissions savings over time, etc.). Reports on this and other data can be generated to assess the value the system provides to an employer.

These and other features of exemplary embodiments of the invention will be in part apparent and in part pointed out to those of ordinary skill in the art upon a review of the teachings herein. The below-described preferred embodiments are meant to be illustrative of the invention and not limiting.

BRIEF DESCRIPTION OF THE DRAWINGS

FIG. 2C depicts an exemplary GUI that could be used to receive vehicle travel plan data from a user;

FIGS. 3A-K depict exemplary data structures for exemplary embodiments of the invention;

FIGS. 6A-6E2 depict exemplary GUI screens for user interaction with the TMS software in accordance with an embodiment of the invention;

FIGS. 9A-D depict exemplary reports that may be generated by exemplary embodiments of the system; and FIGS. 10A and 10B depict a prior art "Rental vs Employee Reimbursement Calculator".

DETAILED DESCRIPTION OF THE PREFERRED EMBODIMENTS

A. General System and Software Configurations

Figure 1A:
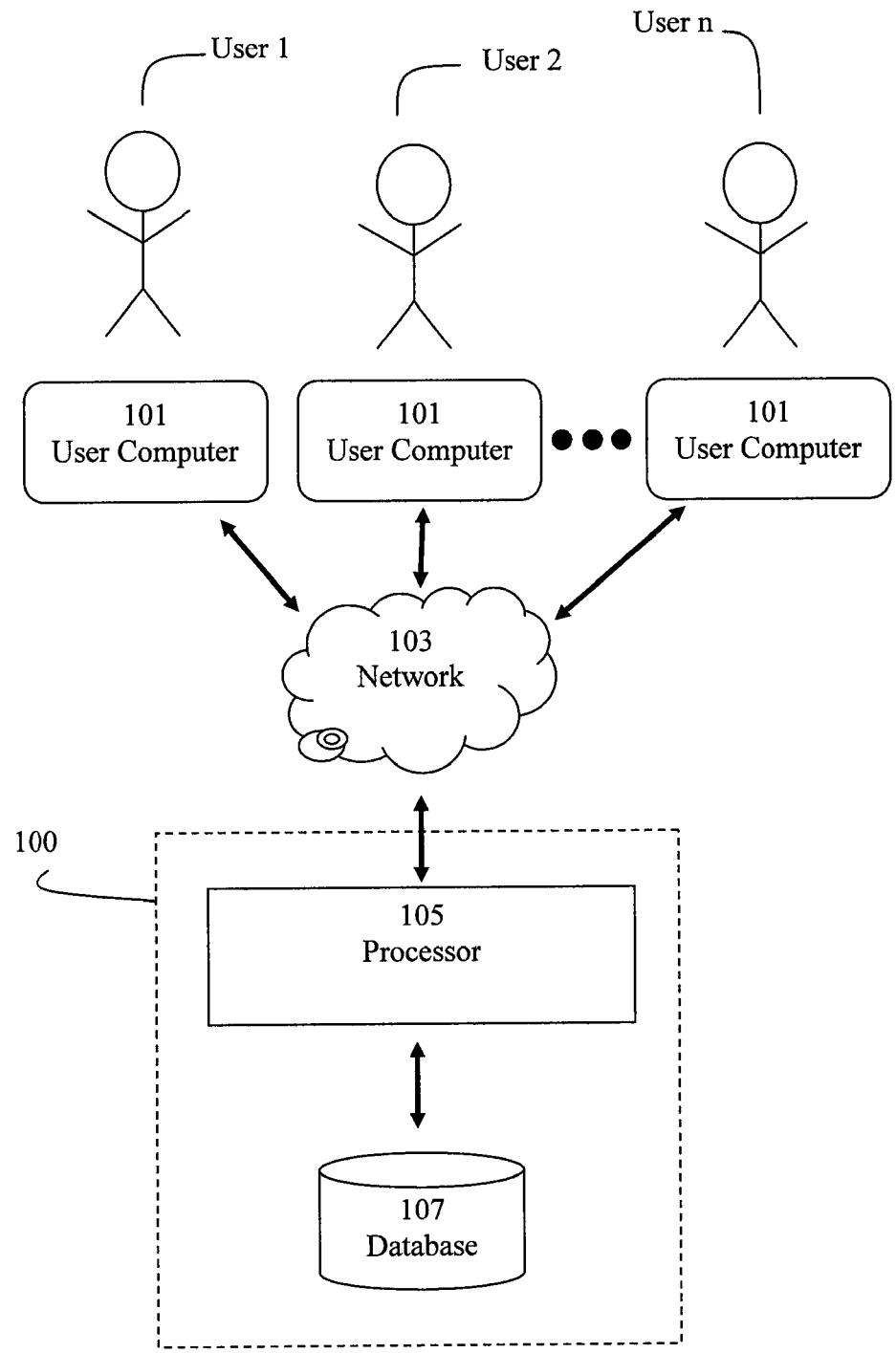
FIGS. 1A-C depict exemplary network environments for embodiments of the invention.

FIG. 1A depicts an exemplary network environment for a travel management system (TMS) 100 in accordance with an embodiment of the invention. TMS 100 is accessed over a network 103 by one or more user computers 101. Network 103 may be any type of data communication network, such as the Internet or a company Intranet, depending on how a practitioner chooses to implement the TMS 100. User computers 101 may take the form of any computer with sufficient computational power and networking capabilities to connect to the TMS 100 over network 103. For example, user computers 101 may take the form of a personal computer (PC), office workstation, or a mobile device such a smart phone or the like (or any combination of such computers). In an exemplary embodiment, the user computers access the TMS 100 over the network 103 using standard browser software (e.g., Internet Explorer), although this need not be the case. Also, in an exemplary embodiment, the different users of the user computers 101 are employees or agents of an employer who will subsidize in some manner the users' vehicle travel, whether that employer be a corporation or some other entity (e.g., some other business entity, a governmental entity, etc.).

Figure 2A:
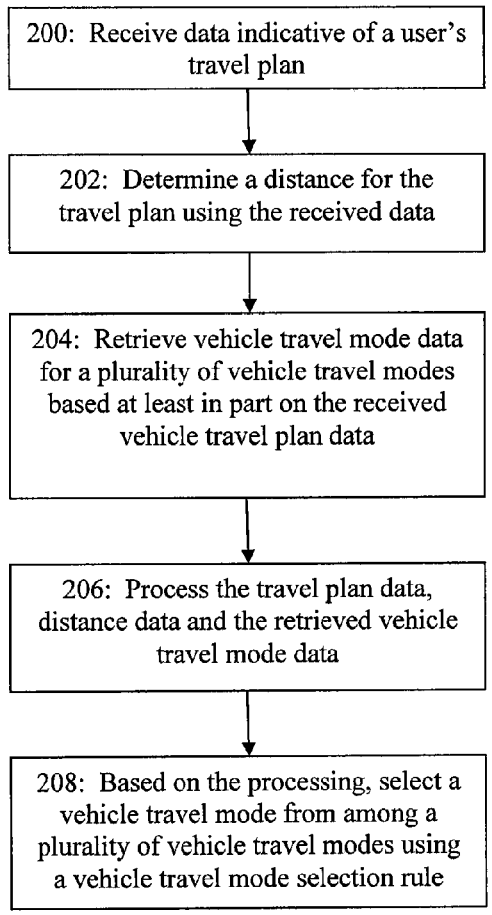
FIGS. 2A-B are flow charts depicting an exemplary program flow for an exemplary embodiment of the invention.

TMS 100 preferably comprises a processor 105 in communication with a database 107. In an exemplary embodiment, the processor 105 is configured as a server accessible by the user computers 101 via the network 103. However, it should be understood that processor 105 may comprise a plurality of processors, including distributed processors and/or multi-processor architectures if desired by a practitioner. The processor 105 is configured to execute a travel management software application 110 that manages the different travel options available to the users of the user computers. As depicted in FIG. 2A, such software 110 can be configured to perform a number of operations.

At step 200, the software receives data from a user that represents the user's travel plan. In an exemplary embodiment, this data comprises the user's destination, the user's origin (although the origin can optionally be defaulted to a known origin such as the user's office address, in which case, if accurate, the user would not need to enter origin data as part of the travel plan) and temporal data for the travel plan (e.g., a date and time for the travel plan, preferably a start date, end date (if the travel plan extends over multiple days), start time and end time).

At step 202, the software determines a distance for the travel plan based at least in part on the received travel plan data. Preferably, step 202 involves the software interacting with a geographic information system (GIS) such that the GIS system computes the distance between the origin and destination of the travel plan and returns this distance to the software 110. A number of well-known third party GIS systems could be used for this purpose. However, in an alternate embodiment, the software 110 may maintain a table that stores distance data between known origins and destinations to avoid the need for repeated interactions with a GIS system. Such an embodiment may be useful in scenarios where many travel plans comprise travel between known and repetitively used origins and destinations (such as travel between branch offices of a company).

At step 204, the software retrieves vehicle travel mode data for a plurality of vehicle travel modes. This retrieval can be based at least in part on the received vehicle travel plan data. For example, the system may store data representative of the reimbursement rate applicable to the reimbursable personal vehicle travel mode. At step 202, the software would retrieve this reimbursement rate. For some employers, it is expected that the same reimbursement rate may be applicable to all reimbursable travel. However, other employers may have reimbursement rates that vary, such as reimbursement rates that vary on an employee-by-employee basis. In such situations, the software would be configured to retrieve the appropriate reimbursement rate based on data such as the user's identity. Another type of vehicle travel mode data that could be retrieved at step 204 is the identification of a vehicle for the reimbursable personal vehicle travel mode. Such data could be stored in a user profile associated with each user who has a vehicle that could be used in the reimbursable personal vehicle travel mode. Another example of vehicle travel mode data that could be retrieved at step 204 is retrieving data for all fleet vehicles that are available in view of the received travel plan data. Still another example of vehicle travel mode data that could be retrieved at step 204 is fuel cost data (whether from a stored memory value or from a third party data source that provides fuel cost information to the system on an as needed basis). Yet another example of vehicle travel mode data that could be retrieved at step 204 is any type of data for the rental vehicle travel mode. For example, step 204 can involve the software providing the travel plan data (or selected portions thereof) to a rental vehicle reservation booking engine to retrieve data for a plurality of rental vehicles that would be suitable for the travel plan, wherein this data would preferably include rental cost data. However it should be understood that more, fewer or different types of vehicle travel mode data could be retrieved at step 204 based on the needs of a practitioner.

It should be understood that the vehicle travel mode data retrieved at step 204 refers to vehicle travel mode data that was not entered by the user who provides the travel plan data at step 200. In effect, the vehicle travel mode data is vehicle travel mode data represents system data that the system either stores in memory (and the software locates for retrieval based on the received vehicle travel plan data) or data that the system retrieves from an external system (such as a third party rental vehicle reservation booking engine (e.g., the booking engine accessible through the Enterprise website)) based on the received vehicle travel plan data. Further still, the vehicle travel mode data can be any data that the software uses to identify, evaluate or quantify aspects of a given vehicle travel mode. For example, the vehicle travel mode data retrieved at step 204 can be information from a user's stored profile that the software uses during step 206. As examples, not only could the user profile store reimbursement rate information and personal vehicle information but the user profile could also store vehicle travel mode data such as a "favorite" rental vehicle class for the user (or a defined minimum rental vehicle class) to govern rental vehicle selections. An exemplary data structure for storing user profiles is discussed below with reference to FIG. 3A.

At step 206, the software processes the received travel plan data based at least in part on the determined distance and the retrieved vehicle travel mode data. As explained in connection with the examples below, this processing preferably involves computing data values that impact the criteria used by the vehicle travel mode selection rule. Furthermore, in embodiments where extensive reporting features are enabled, this step can also involve computing data values indicative of criteria not used by the vehicle travel mode selection rule but are nonetheless relevant to one or more things that a practitioner wants to track. For example, in an embodiment where the vehicle travel mode selection rule is a "lowest monetary cost rule", step 206 can involve computing expected costs for each vehicle travel mode option corresponding to a vehicle travel mode for which data was retrieved at step 204. With such an embodiment, the expected cost for a rental vehicle travel mode would the be the expected cost of the rental vehicle (typically a function of rental duration (as determined by start and end dates for the travel plan (possibly including the start and end times, especially if the subject rental costs are determined on an hourly basis))) plus the expected fuel costs (typically a function of the determined distance, retrieved fuel cost data and the retrieved fuel efficiency (e.g., miles per gallon) of the subject vehicle). The expected cost for a reimbursable personal vehicle travel mode would the retrieved reimbursement rate multiplied by the determined distance. If a practitioner's reimbursement policy builds expected fuel costs into the reimbursement rate, then a separate fuel cost calculation would not be needed for the reimbursable personal vehicle travel mode. However, if a practitioner does not build fuel costs into the reimbursement rate, this step may also include a computation of expected fuel costs as with the rental vehicle travel mode. The expected cost for a fleet vehicle travel mode could be determined in any of a number of ways. For example, a "sunk cost" could be associated with each fleet vehicle that could be treated as a credit in the cost analysis. Expected fuel costs for a fleet vehicle could be computed in the same manner as fuel costs for a rental vehicle.

If a practitioner also wants to track the environmental impact arising from the vehicle travel, step 206 could also be configured to compute an expected amount of carbon emissions for each vehicle travel mode option corresponding to a vehicle travel mode for which data was retrieved at step 204. Any of a number of techniques can be used to estimate carbon emissions, but one exemplary formula would compute the estimated carbon emissions (CE) as:

$$CE = d * ER$$

where d represents the distance for the trip and ER represents an emissions rating for the vehicle (for example, in units of weight of carbon emissions per distance such as pounds per mile). ER data is publicly available for vehicles on a year, make, model (YMM) basis from a variety of sources, including the vehicle manufacturers themselves and other third parties. The system preferably stores ER data in a table in association with the different vehicles that may be used for travel (see, e.g., column 317 in vehicles table 392 of FIG. 3C).

As explained below, in exemplary embodiments, various data tables can be built and populated by the software when performing steps 200-206.

Next, at step 208, the software selects a vehicle travel mode from among a plurality of vehicle travel mode options. This selection is preferably based on (1) which of the vehicle travel mode options satisfy the received vehicle travel plan (in some instances the software could be considered to computed expected costs for a vehicle travel mode option even if a vehicle for that option is not available), and (2) which of the vehicle travel mode options satisfy the vehicle travel mode selection rule.

Upon receipt of travel plan data from the user, the software performs steps 202-208 automatically and transparently form the user's perspective. An exemplary embodiment such as this can be contrasted with the prior art "Rental vs Employee Reimbursement Calculator" shown in FIGS. 10A and 10B in that the exemplary embodiment of FIG. 2A does not require the user to know and enter various types of vehicle travel mode data—instead the software performs these tasks for the user, thereby increasing efficiency and reliability. For example, in an embodiment where the user need only provide travel plan data that comprises a destination, date and start/end times for a trip (see an exemplary GUI for this purpose in FIG. 2C), the inventors note that such an embodiment provides tremendous improvements and advantages relative to the prior art "Rental vs Employee Reimbursement Calculator". For example, as can be seen in the exemplary GUI of FIG. 2C, the user need only provide travel plan data via fields 220, which comprise a destination (the "meeting location", an origin ("your location", which can be defaulted to a pre-selected location or changed to a user-entered address or selection from a list), an input field to identify whether the user will be making a roundtrip to the meeting location and back, and fields for date/time information. Upon entering the necessary data in fields 220 and selecting the "continue" button, the software 110 would performs steps 202-208 automatically and transparently to the user. By contrast, the prior art "Rental vs Employee Reimbursement Calculator" requires the user to know (or at least guess) and enter data values for pieces of information that software 110 automatically obtains during steps 202-204. With such a preferred embodiment, there is no need for the user to know (or guess) any special information beyond what he/she already knows for the purposes of scheduling a trip/meeting, for example, no need to know/guess (1) the distance between the origin and destination, (2) reimbursement rates, (3) fuel costs or (4) rental costs. By building appropriate intelligence into software 110, the preferred embodiment frees users of the need to make complex cost/benefit selections for vehicle travel modes while at the same time enhancing the reliability of those cost/benefit selections.

Figure 2B:
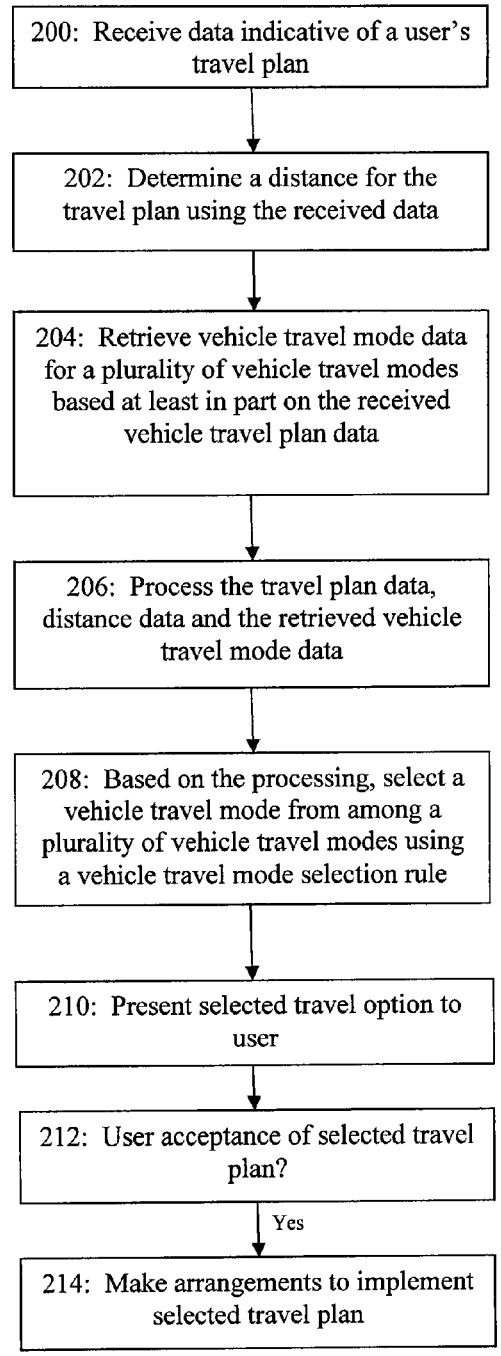

In the exemplary embodiment of FIG. 2B, the software is further configured, at step 210, to present the selected vehicle travel mode to the user. This step preferably involves a GUI being displayed on the user's computer that identifies the vehicle travel mode that the user should use for the trip. This GUI is preferably configured to receive input from the user indicative of whether the user agrees to the selected vehicle travel mode. If the user accepts the selection at step 212, the software is further configured to make arrangements at step 214 to implement the selected vehicle travel mode. For example, if the selected vehicle travel mode is a rental vehicle travel mode, step 214 could include electronically booking a rental vehicle reservation with a rental vehicle service provider. If the selected vehicle travel mode is a fleet vehicle travel mode, step 214 could include reserving the fleet vehicle for use by the user.

Figure 1B:
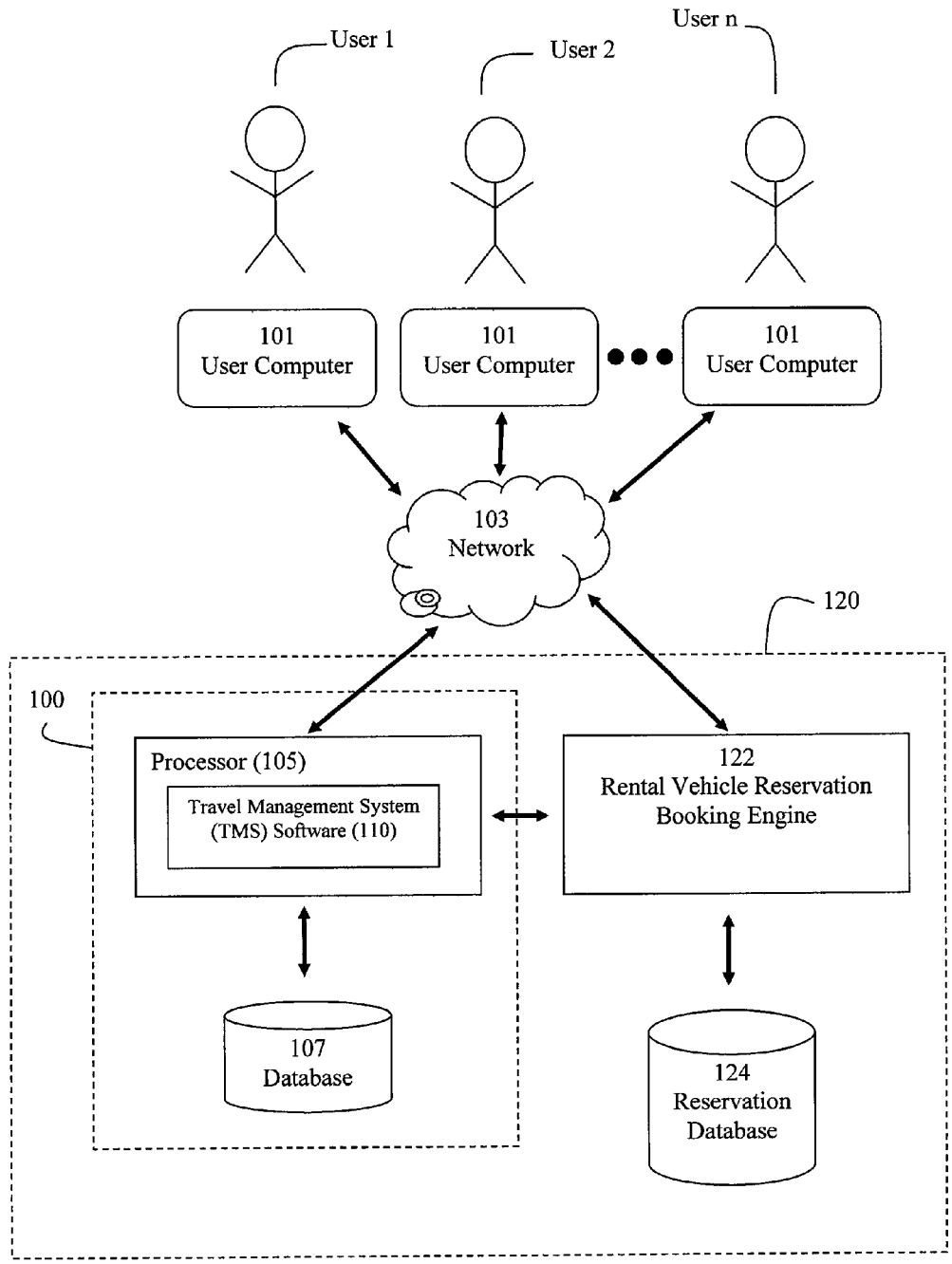

FIG. 1B depicts an exemplary embodiment wherein the TMS 100 is part of a rental vehicle service provider computer system 120. As explained above, the TMS software 110 can be configured to access the reservation booking engine 122 as needed to access data relating to rental vehicle travel mode options. The rental vehicle service provider computer system 120 also preferably includes a reservation database 124 in which reservation data is stored. Reservation database 124 may also be used to store rate data for the rental vehicles available for rent from the rental vehicle service provider. This rate data may include not only standard rates for renting rental vehicles but also alternate rate structures such as negotiated rates that are applicable to rental vehicle transactions from a particular company.

Figure 1C:
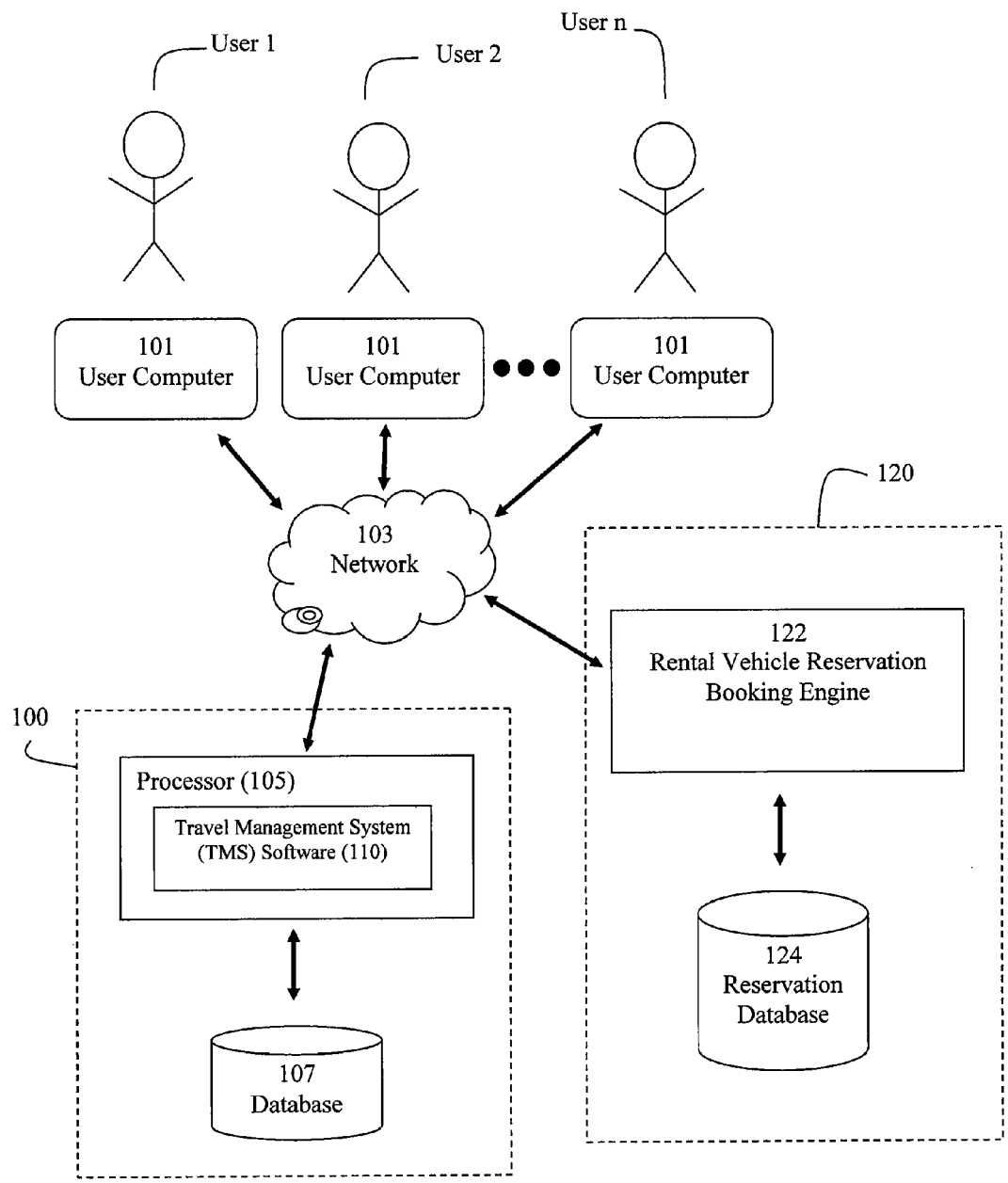

FIG. 1C depicts another exemplary embodiment wherein the TMS 100 is not part of the rental vehicle service provider computer system 120. In such an embodiment, the TMS 100 may be resident within a company's internal network or it may be its own standalone service hosted by a third party that provides travel management services to customers. Further still, with such an embodiment, the TMS software 110 can be configured to communicate with the booking engine 122 via the network 103.

It should be noted that in the embodiments of FIGS. 1B and 1C, the TMS software 110 can connect to the reservation booking engine 122 over network 103 using XML-based web services technology. This allows the system to directly interface with the reservation booking engine to create a rental vehicle reservation without a need for the user to navigate through and interact with a plurality of webpages that are typically encountered on a website to complete a reservation process. Further still, an XML-based web services interface could be used by the TMS software 110 to request and receive cost information for possible rentals (such cost information representing vehicle travel mode data retrieved by the software 110 at step 204). However, this need not be the case.

It should also be noted that the reservation booking engine 122 can be configured to book reservations not only for conventional daily/weekly rentals of rental vehicles but also for hourly rentals of rental vehicles. Such hourly rentals can also be referred to as fractional rentals. In some situations, rental vehicle service providers provide hourly/fractional rental services via "self-rent" rental vehicles as discussed below. Also, in some situations the booking engine 122 may comprise separate booking engines, rate structures and supporting websites for booking daily/weekly rentals and hourly rentals. In embodiments wherein hourly/fractional rentals are one of the travel options, it should be noted that the TMS software 110 can also access a booking engine 122 to assess the costs for hourly/fractional rentals that would satisfy the user's defined travel plan.

B. Vehicle Travel Mode Selection Rules

As noted above, the software may employ any of a number of vehicle travel mode selection rules to control which of a plurality of vehicle travel modes are selected for presentation of the user.

B.1: "Lowest Monetary Cost" Rule

One example of a vehicle travel mode selection rule that could be employed by software 110 at step 208 is a "lowest monetary cost" rule. With such a rule, the software 110 preferably computes an expected monetary cost associated with each vehicle travel mode option and populates a table with this cost information. The software 110 would then select the vehicle travel mode option having the lowest associated monetary cost. If the software 110 is configured to populate this table with vehicle travel mode options that would not satisfy the travel plan (e.g., the subject vehicle for the vehicle travel mode option is not available), the rule would make this "lowest monetary cost" selection from among the available vehicle travel mode options.

As noted above, the computation of expected monetary costs in connection with the rental vehicle travel mode and the reimbursable personal vehicle travel mode is relatively straightforward. For the fleet vehicle travel mode, any of a number of techniques could be used. For example, if fleet vehicles are one of the options for the vehicle travel mode, the "lowest monetary cost" rule could be configured to select a fleet vehicle as the travel mode whenever a fleet vehicle is available. Implementing the "lowest monetary cost" rule in this manner would reflect the "sunk costs" that an employer has already spent on fleet vehicles and minimize new spending on other vehicle travel modes. As an alternative, a practitioner could assign a predetermined "sunk cost" credit to the fleet vehicle travel mode. The cost for the fleet vehicle travel mode could then be computed as the expected fuel costs minus the "sunk cost" amount. However, the inventors note that practitioners could devise any of a number of alternate techniques for assigning an estimated monetary cost to the use of fleet vehicles by employees.

B.2: "Lowest Carbon Emissions" Rule

Another example of a vehicle travel mode selection rule that could be employed by software 110 at step 208 is a "lowest carbon emissions" rule. With such a rule, the software 110 preferably computes a value indicative of an expected amount of carbon emissions that would be produced by each vehicle travel mode option in connection with the travel plan. Preferably, at step 206, the software 110 populates a data table with such carbon emissions estimations. The software 110 would then select the vehicle travel mode option having the lowest associated amount of carbon emissions. If the software 110 is configured to populate this table with vehicle travel mode options that would not satisfy the travel plan (e.g., the subject vehicle for the vehicle travel mode option is not available), the rule would make this "lowest carbon emissions" selection from among the available vehicle travel mode options.

As noted above, the estimating the amount of carbon emissions can use any of a number of techniques, including the example presented above in the formula for CE.

B.3: Weighted Multi-Factor Rule

In perhaps an extremely powerful embodiment, the vehicle travel mode selection rule is implemented as a multi-factor rule that represents a weighted combination of multiple criteria. For example, some practitioners may want the vehicle travel mode selection rule to reflect a combination of monetary cost and environmental considerations. A weighted multi-factor vehicle travel mode selection rule can achieve this goal in any of a number of ways.

As a first example, an estimated amount of carbon emissions can be normalized to a monetary amount which then gets combined the estimated monetary cost to arrive at a data value that governs the vehicle travel mode selection. With such an embodiment, a GUI can be presented to an administrator or other appropriately authorized user to define how the normalization is to be performed. Such a GUI would present a question to the administrator to the effect of "how much money are you willing to spend to save 1 unit of carbon emissions?" together with a data entry field where the administrator would identify this monetary amount (Q). The software 110 would then effectively weight the estimated amount of carbon emissions (CE) by Q to thereby normalize CE into units of money. This value Q*CE would then be added to the estimated monetary cost for the associated vehicle travel mode option to arrive at a data value which controls the selection.

As another example, the data value that controls the selection could be an effectively unitless value that represents a weighted combination of monetary cost and carbon emissions such that estimated carbon emission amount and estimated monetary cost amount are scaled by multipliers that weight these factors as desired by a practitioner. The software 110 would compute the controlling data value using the weighted formula for each of the vehicle travel mode options, and the software 110 would select the vehicle travel mode having the lowest associated data value.

Further still the inventors note that a weighted multi-factor vehicle travel mode selection rule can take into consideration criteria other than the estimated monetary costs and carbon emissions for the vehicle travel modes. For example, in embodiments where the software 110 incorporates ridesharing features, the vehicle travel mode selection rule could also factor in employee time as a criteria that influences how the software will make selections between vehicle travel mode options. An example of this would be a scenario where vehicle travel mode option 1 requires a single vehicle shared by Users A and B but where User B would be required to leave for a destination 30 minutes earlier than he/she would if no ridesharing was employed and an option 2 where Users A and B each take separate vehicles to the destination. The vehicle travel mode selection rule can be configured to take into account employee time when selecting as between the two options. An example of a weighted formula for this type of selection rule is described below in connection with FIG. 3K.

C. Exemplary Data Structures and Process Flows for Travel Management Software FIG. 3A depicts an exemplary data structure 390 for storing user profile information. Each user profile may comprise a user identifier 300, user name 301, user level 302, an identifier of the user's personal vehicle 303, a list of personal friends for the user 304, default locations data 305, and contact information 306 (e.g., email address, mobile phone number, etc.). However, it should be understood that more or fewer and/or different data fields could be used in the user profile data structure 390. For example, some practitioners may wish to disable or exclude a "friends list" feature reflected by field 304 to reduce the potential for interpersonal conflicts arising from possible clique-ish behavior by employees. User level 302 indicates the user's associated level in data structure 393 and is described below with reference to FIG. 3D. Personal vehicle field 303 lists vehicle identifiers (shown in FIG. 3C) associated with the user. Friends list field 304 lists user identifiers for preferred ride-share partners. Default location 305 may be used to designate default travel data such as a designation of a default origin for different times of day. For example, Cindy's record indicates that her origin is presumed by default to be location identifier Q (shown in FIG. 3E) between 9:00 am and 5:00 pm, and at location R between 5:01 pm and 8:59 am. Default location field 305 may be extended to indicate different default information for different days of the week, or for weekdays, weekends, etc. For example, Cindy's default location may be location Q only on weekdays.

User profiles may also store other information about a user that would be helpful in defining the user's travel plans. For example, user profile may comprise a username and password for gaining access to the system and/or profile. The user profile may further comprise the user's home address, typical work addresses, and typical working hours (e.g., by day-of-week). User profile data may further include an indication of a preferred vehicle type. For example, users may indicate that they are not willing to drive a vehicle having a manual transmission. The system may also store data indicative of a user's driving record. For example, the system may store a flag that is used to determine whether the user is allowed to have passengers in the user's personal vehicle, and/or a flag that is used to determine whether the user is allowed to drive specific vehicle types (e.g. fleet vehicles or rental vehicles).

FIG. 3B depicts an exemplary data structure 391 for storing designated user groups (DUGs). Records in the DUGs table 391 preferably comprise a field 307 for identifying a DUG and a field 308 for identifying a user level for users within the corresponding DUG. Designated user groups may be used to determine ride-share suggestions as described below with reference to FIG. 4A-D.

FIG. 3C depicts an exemplary data structure 392 for storing vehicle information. Each vehicle record preferably comprises a vehicle identifier 310, an owner identifier field 311 (which may correspond to a user identifier 300), a vehicle type 312 (personal, fleet, rental, etc.), location field 313, seating capacity 314, make 315, model 316, CO2 emissions field 317, and cost field 318. The location field 313 may be updated by the system at the start of each day, or more frequently. Vehicle location may optionally be tracked automatically, e.g. using vehicles equipped with GPS systems and wireless electronic communication, or manually, e.g. by employees entering vehicle location data into the system. The system may be configured to automatically update vehicle location based on user input, e.g., input indicating that travel has been completed using a particular vehicle. Emissions data 317 serves as a metric for assessing a carbon emissions effect of operating the corresponding vehicle. Preferably, the data within the emissions data field reflects units such as mass per distance (e.g., grams/mile or grams/kilometer, etc.), and may comprise multiple values (e.g., different emissions values for different types of fuel). Emissions data may be retrieved from an external emissions data provider such as emissions data provider 820 shown in FIGS. 8A-C, which may provide emissions data on the basis of vehicle make and model. Cost data 318 may stored in various units, for example cost per distance (such as dollars per mile or kilometer). In the example of FIG. 3C, the cost for employee personal vehicles V1-V3 is $0.60/mile reflecting a company-wide travel reimbursement rate (which includes all expenses, such as fuel). For vehicles V4 and V5 which are corporate-owned, the cost may reflect the estimated cost per mile for fuel as well as additional maintenance from increased use of the vehicle. For vehicle V6, which is a retail rental from a rental service provider, the cost may reflect both a daily fee and a cost per mile for fuel.

HONDA, CIVIC, and ACCORD are federally registered trademarks of Honda Motor Co., Ltd., 1-1, Minami-Aoyama 2-chome Minato-ku; Tokyo 107-8556 Japan.

TOYOTA, TACOMA, and PRIUS are federally registered trademarks of Toyota Jidosha Kabushiki Kaisha, 1, Toyota-cho Toyota-shi, Aichi-ken Japan 471-8571.

MINI COOPER is a federally registered trademark of Bayerische Motoren Werke Aktiengesellschaft Aktiengesellschaft, Petuelring 130 80809 München, Germany.

FORD and MUSTANG are federally registered trademarks of FORD MOTOR COMPANY, The American Road, Dearborn Mich. 48121.

For rental vehicles, the system can obtain all information, including cost and passenger capacity data, from reservation booking engine 122. Vehicle information for personal and/or fleet vehicles may be received via user input (whether from the vehicle owner or an administrator).

A corporate vehicle fleet may comprise purchased, leased, and/or rental vehicles. Vehicle administration and/or tracking may be performed by the corporation or by a third party, such as a rental vehicle service provider. For example, the employer may pay a fee to a leasing company to maintain a fleet of leased vehicles on-site for employee use (e.g., a monthly, yearly or other fee). As another example, the employer may pay a fee to a rental company to maintain a fleet of "self-rent" rental vehicles on-site for employee use (e.g., a monthly, yearly or other fee). Such fees represents a sunk cost in that the employer has already spent money to provide travel options to employees. Thus, an employer may desire a vehicle travel mode selection rule that reflects such sunk costs by prioritizing the use of this sunk cost vehicle inventory before considering travel options that would incur new costs. These fees may or may not be reflected in the cost field 318 for fleet vehicles.

It should be noted that "self-rent" rental vehicle refers to a rental vehicle that is equipped with hardware to permit pickups and returns by drivers without requiring those drivers to visit a rental vehicle branch location to pickup and return keys (or interact with personnel of a rental vehicle service provider to pick up and return keys). An example of "self rent" rental vehicles that are available in the marketplace are the WECAR rental vehicles available from Enterprise. WECAR is a federally registered trademark of Enterprise Rent-A-Car Company, 600 Corporate Park Drive, Saint Louis, Mo. 63105.

FIG. 3D depicts an exemplary data structure 393 for storing user level information. An entity having multiple users may wish to assign users to a plurality of levels. For example, a corporation may assign all employees of the same type to a certain level. For example, all delivery drivers may be assigned to level 1, all sales staff and engineers may be assigned to level 2, and all managers may be assigned to level 3. The system may use these levels to determine ride-share groupings (e.g., users having identical level are grouped together). Levels may also be used to define the authority of associated users when interacting with the TMS. For example, each level may comprise an indication of whether the user has sufficient authority to decline various system options, and/or to modify components thereof. Field 321 indicates whether the users at a given level can decline suggested ride-shares. Field 322 indicates whether users at a given level can decline suggested vehicles. Field 323 indicates whether users at a given level can decline suggested travel routes, and field 324 indicates whether users at a given level can make modifications to suggested travel options. Field 325 indicates a time value for users at a given level, which allows the system to take into account the relative value of different employee's time, which may be higher for management than for delivery drivers. Thus, time values can be useful when the system selects from among a plurality of available travel options, as described below with reference to FIG. 4A.

Figure 8A:
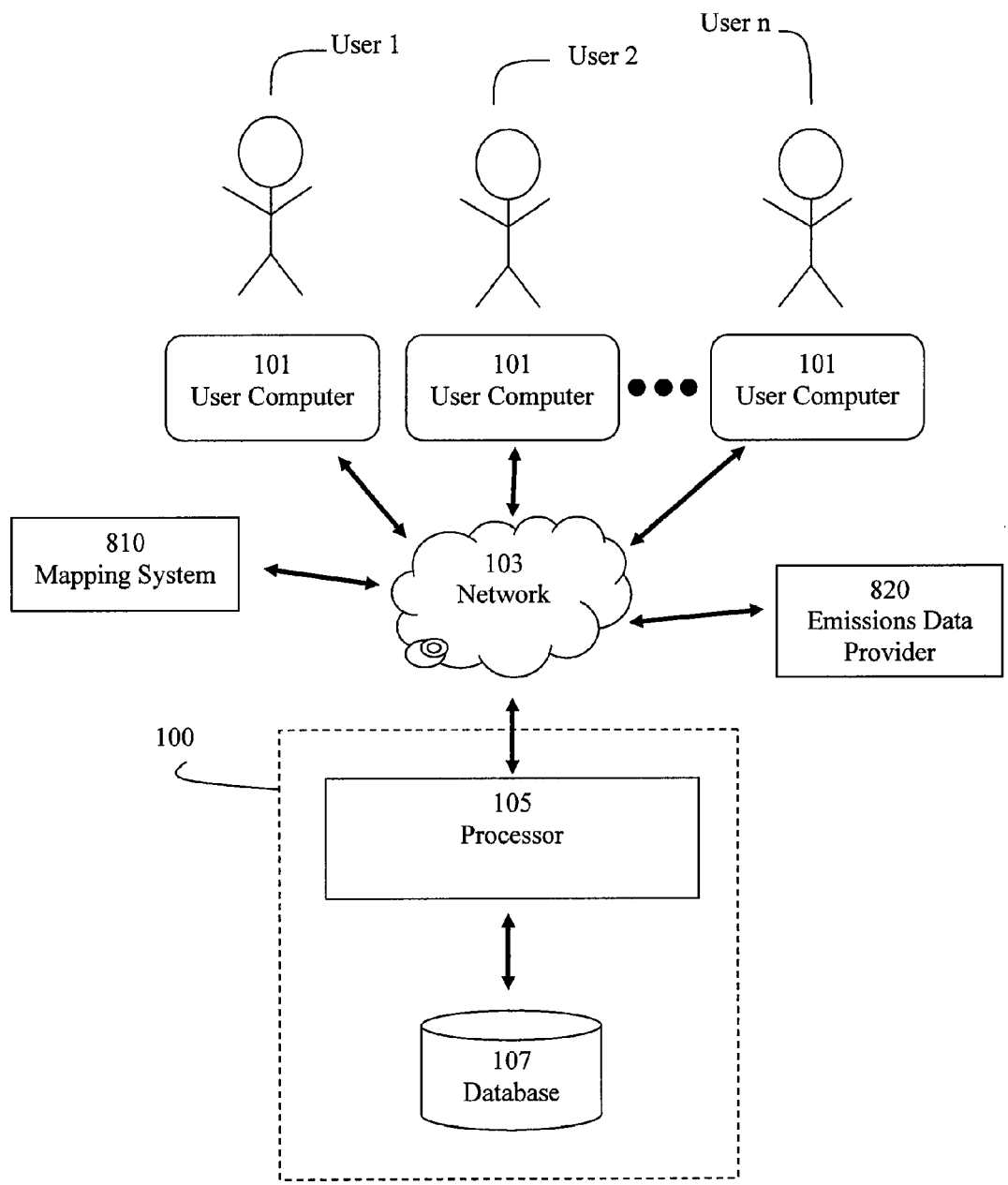
FIGS. 8A-C depict exemplary network environments for additional embodiments including interfaces with external data providers.
Figure 8B:
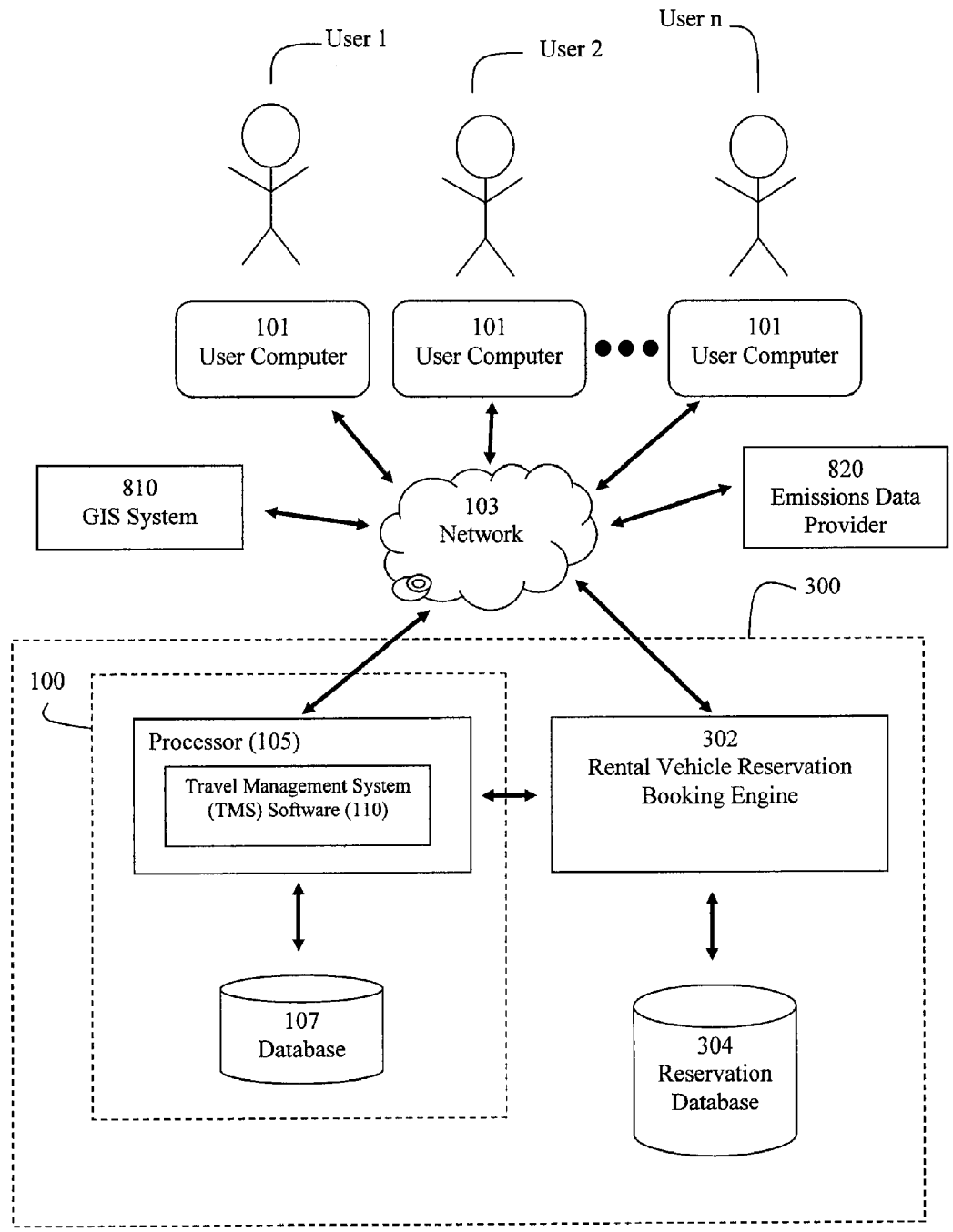
Figure 8C:
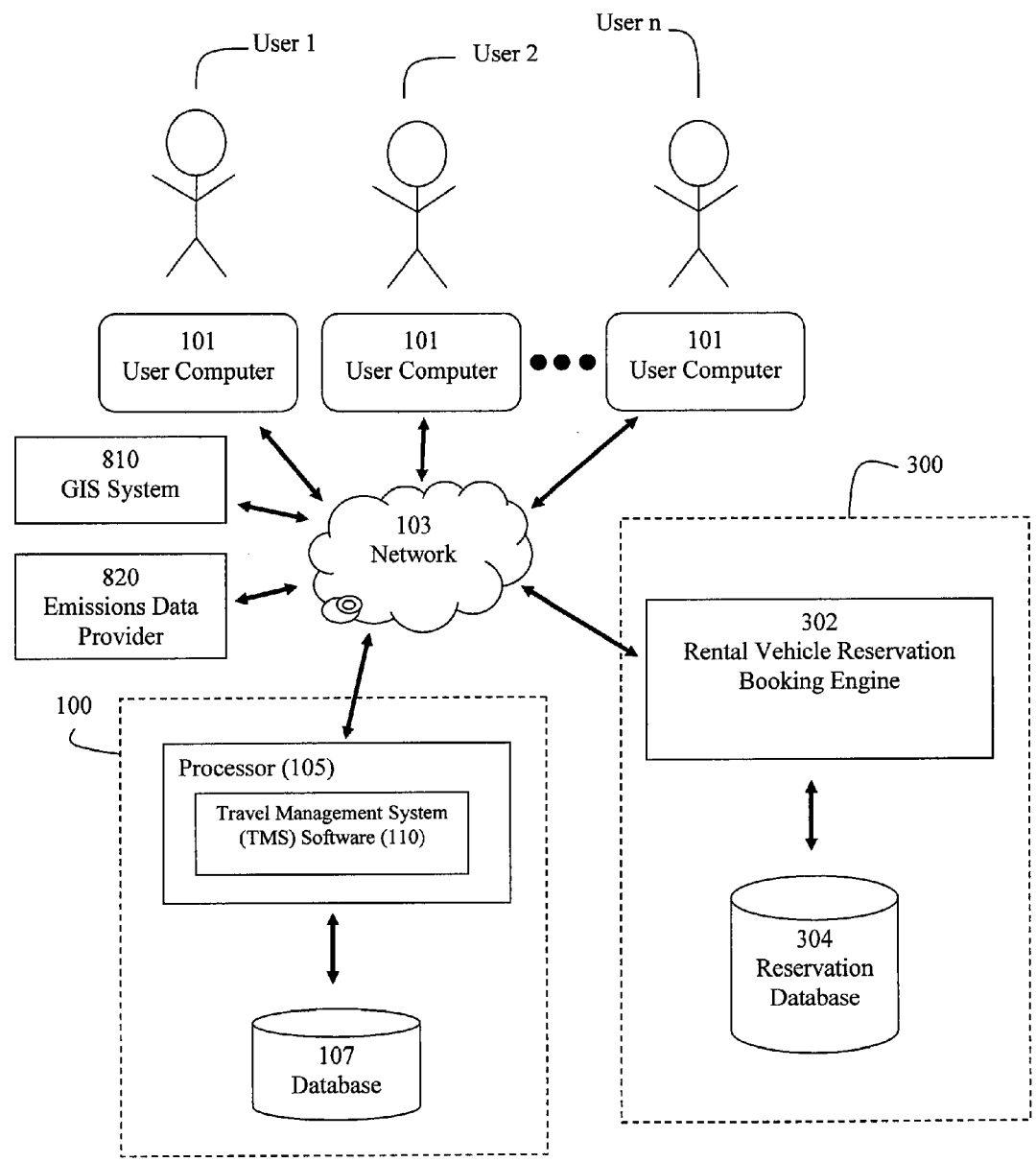

FIG. 3E depicts an exemplary data structure 394 for storing location information. Fields include location identifier 330, description 331, address 332, latitude 333, and longitude 334. The system may be configured to perform distance and route calculations based on location address and/or latitude and longitude coordinates. The system may be configured to receive user input of some location information and automatically determine additional information. For example, the system may be configured to receive user input for a new location comprising a description and address. The system could then determine latitude and longitude coordinates on the basis of the received address, e.g. from a GIS mapping system 810 as shown in FIGS. 8A-C, as is known in the art. However, in a more simplistic embodiment, the system may contain prestored distance data indicating distance between locations, to thereby eliminate (or partially eliminate) the need for mapping and path-finding.

Figure 6A:
Figure 6A:
Figure 6A:
Figure 6A:
Figure 6A:
Figure 6A:
Figure 6A:
Figure 6A:
Figure 6A:
Figure 6A:
Figure 6A:

FIG. 3F depicts an exemplary data structure 395 for storing travel plans. Each travel plan record in the travel plans data structure 395 preferably comprises a plan identifier 340, a user identifier 341, origin 342, a first destination 343, a date/time for the first destination 344, an optional second destination 345, an optional second date/time for the second destination 346, and may further comprise additional destinations and associated date/time fields. The system is preferably configured to populate the travel plans data structure based on received user input at step 200. Exemplary web pages for interacting with users to obtain travel plan input are depicted in FIGS. 6A-E2. The system may further be configured to automatically generate travel plans for some users. For example, the system may automatically generate travel plans for delivery drivers in order to satisfy vehicle or package delivery needs.

FIG. 3G depicts an exemplary data structure 396 for storing identified ride-share groups. The data structure preferably comprises a group identifier 370 and a list of associated plan identifiers 371. This structure allows the system to store identified ride-share opportunities.

FIG. 3H depicts an exemplary data structure 397 for storing travel routes. Each travel route comprises a route identifier 350, one or more user identifiers 352, origin 353, destination 354, date/time 355, distance 356, and status 357. Travel routes may be created automatically by the system in the course of creating travel options (described below) to satisfy user travel plans. Travel routes may also be created or modified on the basis of user input. In an exemplary embodiment described below, each travel route may be associated with a vehicle.

FIG. 3I depicts an exemplary data structure 398 for storing vehicle travel mode options. It should be understood that a vehicle travel mode option refers to a particular instance of an option that can be employed for a particular vehicle travel mode. Essentially, a vehicle travel mode option is specific to a particular vehicle or vehicle type. Thus, a given vehicle travel mode may have a plurality of vehicle travel mode options. For example, the rental vehicle travel mode may have a first vehicle travel mode option corresponding to a mid-sized rental vehicle and a second vehicle travel mode option corresponding to an economy-sized rental vehicle. A reimbursable personal vehicle travel mode may have a first vehicle travel mode option corresponding to User A's personal vehicle and a second vehicle travel mode option corresponding to User B's personal vehicle. Further still, the same can be said for the fleet vehicle travel mode (with different vehicle travel mode options corresponding to different particular fleet vehicles). Each vehicle travel mode option comprises an option identifier 360, a list of plan identifiers 361, a list of route identifiers 362, vehicle identifier 363, cost 364, emissions 365, distance 366, employee time 367, weighted value 368, and status 369. List of plan identifiers 361 comprises a list of plans that are satisfied by the vehicle travel mode option. The list of route identifiers 362 lists the travel routes used by the vehicle travel mode option to satisfy the listed plans. Vehicle identifier 363 indicates the vehicle to be used for the travel routes. In the exemplary embodiment of FIG. 3I, it will be assumed that the same vehicle is always used for all routes associated with a vehicle travel mode option, but this need not be the case. Cost 364 indicates the total estimated monetary cost for the vehicle travel mode option, emissions field 365 indicates the total estimated emissions for the vehicle travel mode option ($CO_2$ in kg), and distance field 366 indicates the total estimated distance for the vehicle travel mode option. Employee time cost 367 is computed on the basis of the routes traveled by users in the vehicle travel mode option, in conjunction with each user's associated time value 325. Weighted value 368 is computed on the basis of other parameters (e.g., cost 364, emissions 365, employee time 367) for a vehicle travel mode option utilizing multipliers according to pre-determined rules. This allows the system to select from among available vehicle travel mode options satisfying a travel plan based on employer concern for the various parameters. Status 369 indicates whether the vehicle travel mode option has been suggested, confirmed, or completed, as described below. A vehicle travel mode option that is selected for suggestion by the system may be referred to as a "travel suggestion." A confirmed travel suggestion may be referred to as a "travel solution." The requirements for confirming a travel suggestion may be set by the practitioner. For example, the system may be configured to receive acceptance from one or more travelers involved before marking a travel suggestion as confirmed.

FIG. 3J depicts an exemplary data structure 399 for storing travel solutions. When the system marks a vehicle travel mode option confirmed, a travel solution is created. The travel solution comprises a solution identifier 370, a list of plan identifiers 371, a list of route identifiers 372, vehicle identifier 373, cost 374, emissions 375, distance 376, employee time 377, weighted value 378, and status 379. The status of a travel solution will typically be either "confirmed" or "completed." For example, the system may be configured to mark a travel solution as completed only after receiving user input indicating that the travel solution was actually implemented according to plan.

FIG. 3K depicts an exemplary data structure 380 for storing various system variables. These variables are described in detail below.

Preferably, the system is configured to receive user/administrator input of various information at any time. For example, the system is preferably configured to allow new users to create new user profiles and to allow existing users to modify their user profiles at any time. User input may be received via user input web pages or any other method known in the art. Preferably the system implements data permissions to protect data from unauthorized changes, as is known in the art. For example, users are only allowed to edit their own user profiles, while system administrators may have full authority to edit any data in the system.

D. Ridesharing

FIGS. 4A-E depict an exemplary process flow for TMS software 110 in accordance with another embodiment of the invention. With this exemplary embodiment, the TMS software 110 is configured to identify ride-share opportunities for travel plans, compute a pre-determined set of parameters for one or more vehicle travel mode options, and select a travel suggestion on the basis of pre-determined rules.

At step 400, the system receives travel plan data from a user (and preferably from a plurality of users). This step preferably operates like step 200. The travel plan data received at step 400 may comprise (1) a user identification, (2) date, (3) origin, (4) departure time, and (5) destination. The travel plan data may further comprise an indication that the user is willing to use a personal vehicle, and a description of the user's personal vehicle. Exemplary GUIs for receiving travel plan data from users are shown in FIGS. 2C and 6A-C. Preferably, the system retrieves information from the user's profile and pre-populates some of the data entry fields for added convenience (e.g., pre-filling data relating to the user's identity, data relating to the user's personal vehicle, etc.). Preferably, the system stores the received travel plan data in data structure 395, with data structure 395 preferably being stored in database 107.

At step 402, the system searches for potential ride-sharing opportunities. The system may be configured not to proceed to step 402 for a given travel plan until a certain time period before the start of the travel plan, e.g. time cut-off 388 in system variables data structure 380. At step 402, the TMS software 110 can be configured to compare the travel plan data of multiple users to identify common itineraries. Such a scenario might arise where two co-workers need to travel from the same company office to the same meeting. Rather than having such employees travel separately, with each employee creating a travel cost for the employer (e.g., both employees being reimbursed for mileage on their personal vehicles or both employees renting their own rental vehicles to travel to the meeting), the TMS software 110 can be configured to consolidate the travel plans of the two employees.

Figure 4A:
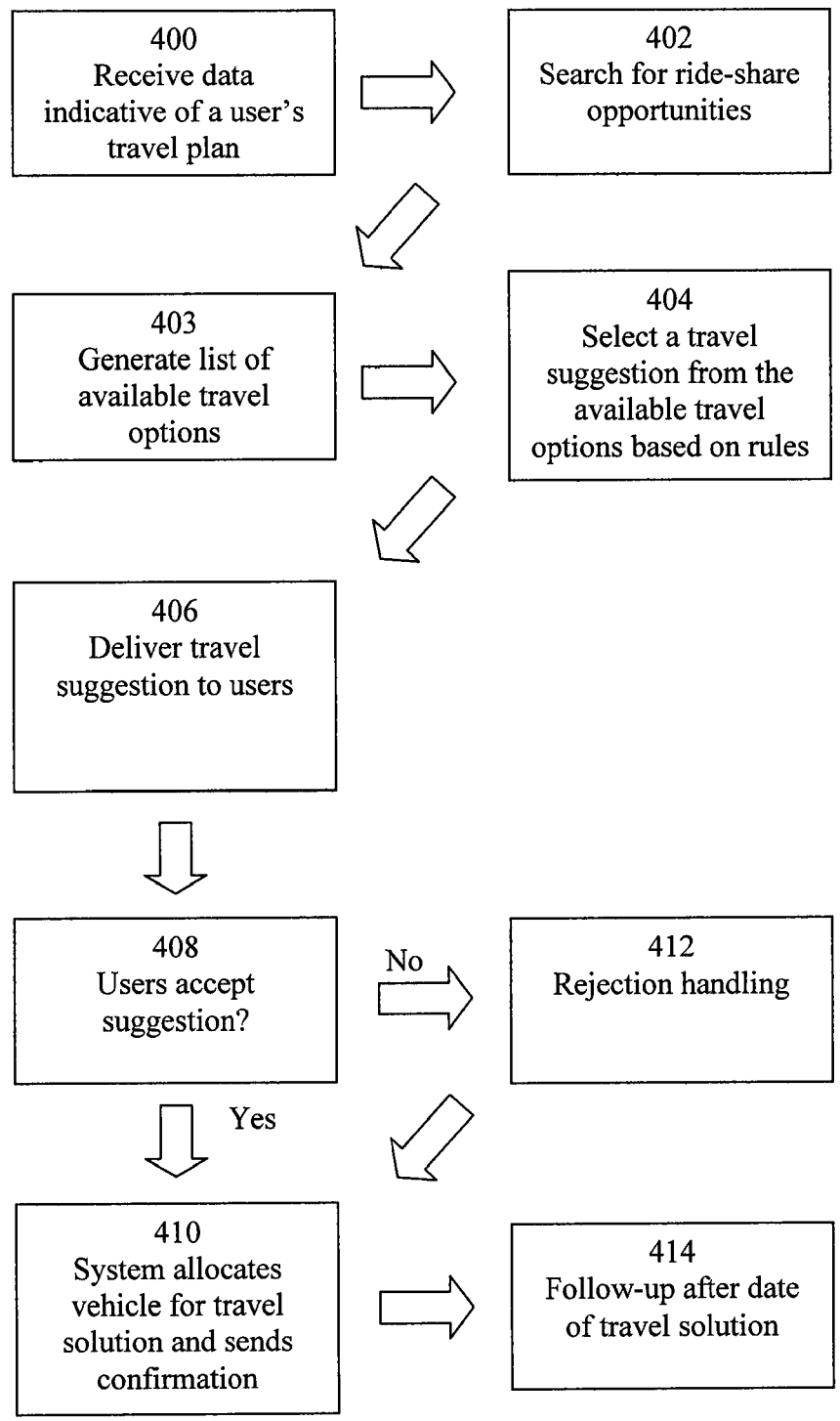
FIGS. 4A-D are flow charts depicting an exemplary program flow for another exemplary embodiment of the invention.
Figure 4B:
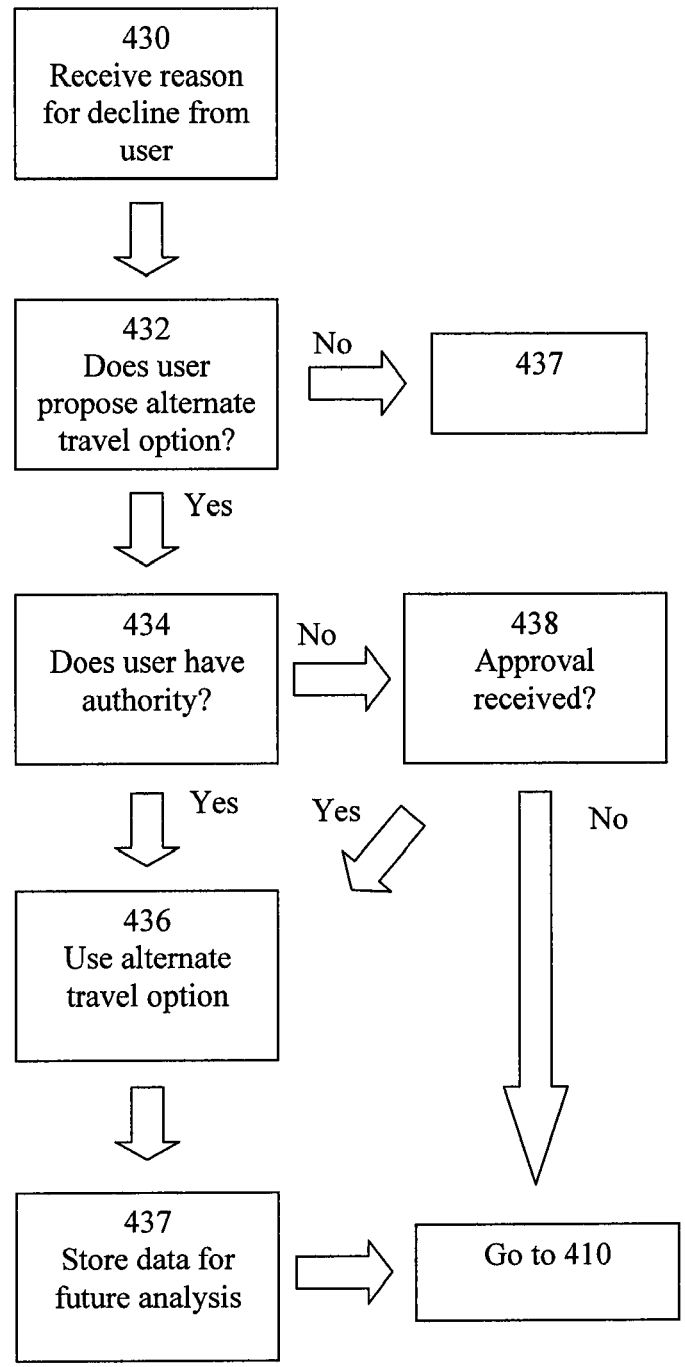
Figure 4C:
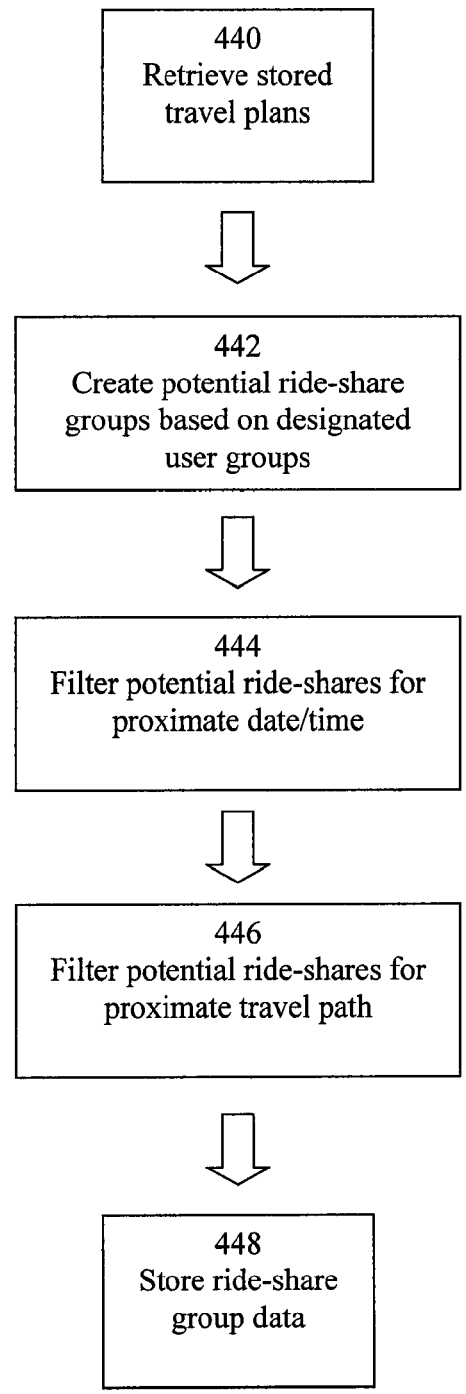

FIG. 4C depicts an exemplary embodiment for step 402 in greater detail. At step 440, the system retrieves a plurality of stored travel plans.

At step 442 the system searches for instances of multiple travel plans for users in the same "designated user group," and creates a list of potential ride-share groups, as shown in FIG. 3G. Each potential ride-share group comprises a list 348 of travel plans grouped by designated user group. A designated user group may be defined by the system to comprise all other employees in the system. However, alternative arrangements are possible. For example, a designated user group may be defined to include only users having the same employee level 302.

In an exemplary embodiment, the system may be configured to store a "friends list" (e.g., 304) for each user. The system may allow users to define which co-workers will be considered "friends". Friends lists may be used in conjunction with designated user groups. For example, the system may identify ride-share opportunities based on designated user groups, but further refine ride-share suggestions based on friends lists. For example, if a travel option involves multiple vehicles, the system may be configured to group mutual friends into the same vehicle. As another example, a designated user group may be defined to comprise only users who are listed as mutual "friends." Alternatively, a designated user group may be defined as all users having the same employee level who are also mutual "friends." Further still, the user may be given the ability to define non co-workers as "friends" as desired by a practitioner.

At step 444, the system compares the date/time fields (e.g., 344, 346) for the travel plans in each potential ride-share group. Travel plans having proximate date/time data are matched. The system may store matches as new potential ride-share groups. Travel plans that do not have proximate date/time data are eliminated from consideration as ride-shares. It should be noted that the TMS software can be configured to control how close together dates and times must be to be considered "proximate". For example, the TMS software can be configured to require exact matches with respect to dates and matches within a programmatically-defined (and optionally user-adjustable) threshold (such as 15 minutes) with respect to times. Furthermore, the time thresholds may vary from user to user. For example, the system may define longer time thresholds for lower level employees and shorter time thresholds for higher level employees to reflect employer decisions about the relative value of each employee's time. Further still, the user profiles may be configured to store the time thresholds for each user. Users may be given the ability to define their own time threshold values, or this ability may be limited to administrators. Such time thresholds may be based on user profile data such as time value 325 or Time Threshold 326. Time thresholds may be adjusted based on the total distance for the travel plan (e.g., allow greater discrepancy for longer trips).

At step 446, the system compares the travel paths for the travel plans in each potential ride-share group. A travel path for a travel plan is defined at least in part on the basis of the origin and destination fields (e.g., 342, 343, 345) for the travel plan, and travel paths may be generated using path-finding techniques known in the art. Travel plans having proximate travel paths are matched according to pre-determined rules. The system may store matches as new potential ride-share groups. Travel plans that do not have proximate travel paths are eliminated from consideration as ride-shares. The TMS software can be configured with various rules for finding proximate matches in travel path data. One exemplary rule for matching travel paths is to require exact matches between all origin and destination fields. Another exemplary rule is to require an exact match between at least one location (origin or destination) and further require that any non-identical origin/destination locations be within a pre-determined distance threshold (e.g. Ride-share distance threshold 383). As noted above, location data preferably comprises latitude 333 and longitude 334, which makes distance computation straightforward. Distances between locations may also be determined by querying GIS system (e.g., 810).

In an exemplary embodiment, the system may compute an "out-of-the-way" value comprising a distance (e.g., a number of miles or kilometers) that a first traveler would have to travel in order to pick up a second traveler, and distance that the first traveler would have to travel in order to deliver the second traveler to the second traveler's destination, before continuing on the first traveler's path. This may be calculated for multiple travelers. This "out-of-the-way" value would then be compared with the threshold to decide whether the travel paths are "proximate". Such path thresholds may vary from user to user. For example, the system may define longer path thresholds for lower level employees and shorter path thresholds for higher level employees to reflect employer decisions about the relative value of each employee's time. Further still, the user profiles may be configured to store the path thresholds for each user, and users may be given the ability to define their own path threshold values. With such an embodiment, by setting a path threshold to zero, the system would effectively require an exact match between origin and destination.

At step 448 the system stores any identified ride-share opportunities, e.g. in ride-share groups data structure 398 stored within database 107. Travel plans in these stored ride-share groups have matching designated user group, proximate travel date/time, and proximate travel paths. The system may be configured to limit the maximum number of travelers associated with a single ride-share group.

Returning to FIG. 4A, at step 403 the system generates a list of vehicle travel mode options. Depending on a practitioner's desires, the system can be configured to filter vehicle travel mode options by availability with respect to constraints in the travel plan (e.g., is a particular vehicle option available on the date/time defined in the travel plan) when building data structure 398. Alternatively, the system can be configured to build data structure 398 without regard to availability and then perform "availability" filtering when selecting which vehicle travel mode option is selected as a travel suggestion. While either implementation would be suitable, the inventors note that building data structure 398 without regard to availability and then performing availability filtering later in the process may enhance the depth of data used by the system for reporting.

Vehicle travel mode options may be stored in data structure 398. At step 404, the system analyzes the vehicle travel mode options to decide which of these vehicle travel mode options should be selected as a travel suggestion. As explained above, this step may apply a vehicle travel mode selection rule, such as a cost minimization rule, to make this selection.

Figure 4D:
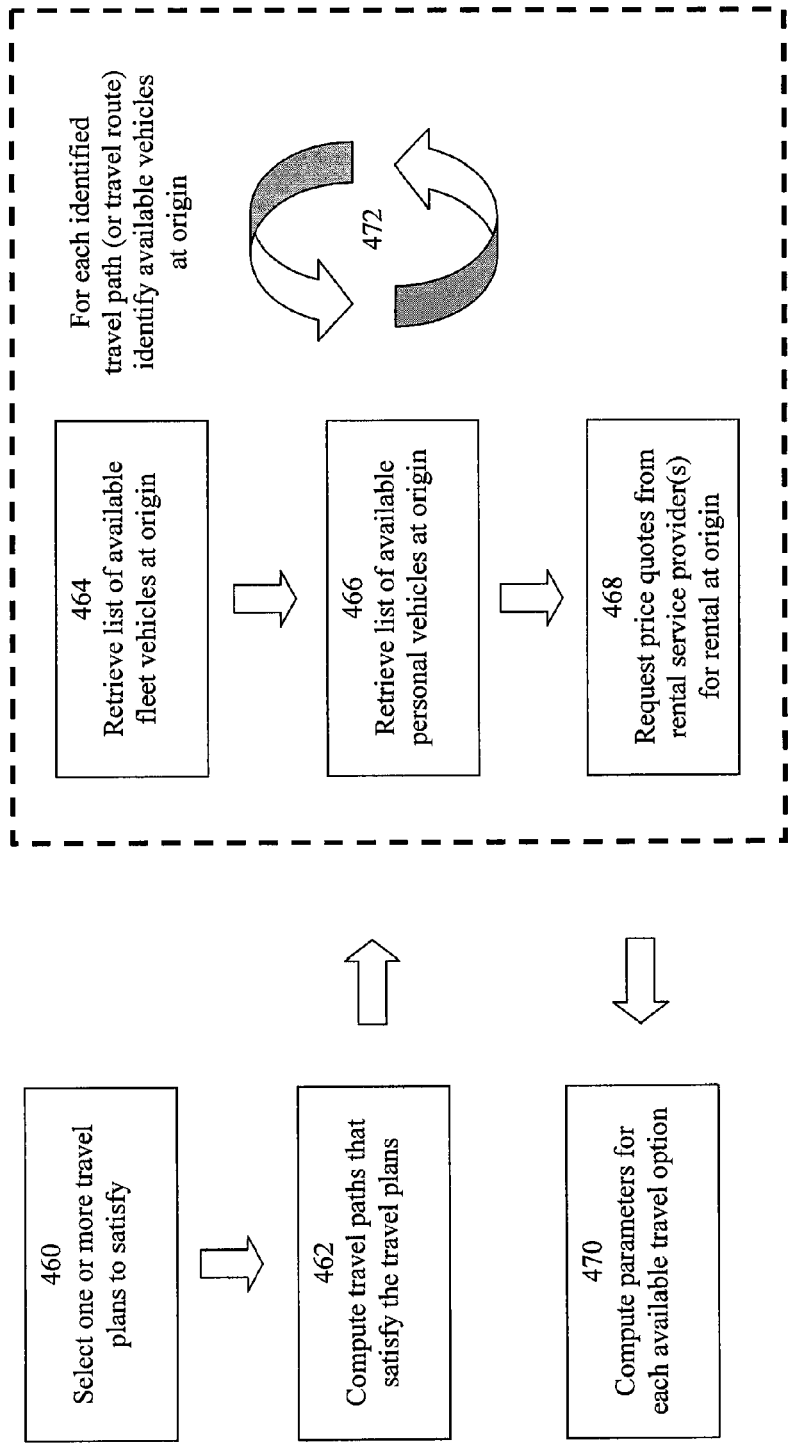

FIG. 4D depicts an exemplary embodiment for generating one or more vehicle travel mode options, e.g., at step 403. Each created vehicle travel mode option comprises one or more travel routes derived from the travel plans. An exemplary data structure for storing vehicle travel mode options 398 is shown in FIG. 3I, and an exemplary data structure for storing travel routes 397 is shown in FIG. 3H.

At step 460, the system selects one or more travel plans that will be satisfied by the newly generated vehicle travel mode options. The system preferably creates vehicle travel mode options for travel plans in a ride-share group together. For example, the system may be configured to search ride-share groups 398 to find a stored ride-share grouping, and to select all of the plans associated with the ride-share group for satisfaction by the new travel option(s).

At step 462 the system computes a list of possible travel routes, grouped into sets of travel routes that satisfy all selected travel plans. A travel path comprises one or more travel routes. Thus, as already noted, each vehicle travel mode option comprises a travel path that satisfies one or more travel plans. For travel options that satisfy a single travel plan, or a plurality of travel plans having identical origin/destination locations, the generation of travel routes is relatively straightforward. Mapping systems (e.g., 810) for creating travel routes are well known in the art. The system may connect to a mapping system 810 to request one or more sets of travel routes that satisfies the travel plan. Mapping system 810 may be configured to provide different route possibilities. For example, the system may return one route that utilizes freeways, and another route that avoids freeways. For travel options that satisfy multiple travel plans having different origin and/or destination locations, the system may implement path-finding logic to identify one or more travel paths that will satisfy all travel plans. As described above, the system may create a travel path that takes some users out of their way to pick up other users.

Vehicle availability loop 472 comprises steps 464, 466, and 468. The system preferably executes loop 472 for each travel path identified in step 462. At step 464 the system retrieves a list of available fleet vehicles at the origin for the travel path, which is defined as the origin for the first travel route in the travel path. Step 464 may comprise searching vehicles data structure 392 for vehicles having a location 313 equal to the travel path origin location. At step 466 the system retrieves a list of personal vehicles available at the travel path origin. Step 466 may comprise searching user profiles for users associated with the travel option to identify personal vehicles. Step 466 may further comprise searching vehicles data structure 392 for vehicles having a location 313 equal to the travel path origin. At step 468 the system requests price quotes for available rental vehicles at the origin from one or more rental vehicle service providers. Step 468 may comprise connecting to a rental vehicle service provider server via web services. Thus, step 468 may involve interacting with a reservation booking engine 122 to identify available rental vehicles. Rental vehicles may comprise daily, weekly, and/or hourly rentals, including "self-rent" rental vehicles.

Steps 464 and 466 may further comprise searching travel solutions data structure 399 to determine whether a vehicle is scheduled to be moved from its current location, e.g. to find a vehicle that is scheduled to arrive at the travel path origin and be available in time to satisfy the travel plan, or to determine that a vehicle is scheduled to be used for a different travel solution that would prevent it from being available for the travel plan. The system may be configured to take note whenever a fleet vehicle is not available due to an already-confirmed travel solution. The system could then generate a report to summarize the occurrence of such instances.

Various rules may be implemented to deal with insufficient vehicle capacity. In an exemplary embodiment, the system is configured to only consider available vehicles having a capacity sufficient to accommodate all users associated with the ride-share group. For example, if at step 403, no vehicles are found having a sufficient capacity, the system may be configured to react by splitting the ride-share group into two groups, and re-running step 403.

In an exemplary embodiment, the system computes vehicle travel mode options for all possible variations of ride-share groups. This could be easily achieved by creating a new ride-share group for each sub-combination of identified ride-share groups. Although this would be computationally intensive, it may also provide increased efficiency in some situations by allowing the system to consider many more vehicle travel mode options.

In an exemplary embodiment, the system is configured to allow multiple vehicles to be used in one vehicle travel mode option. In such an embodiment the system would store a vehicle identifier for each travel route (e.g., 397) in each travel path, and the system would be configured to execute loop 472 for each travel route in each travel path. This would allow the system to select different vehicles for different segments of a travel path. This added granularity would add complexity to the system but may also provide increased efficiency in some situations by allowing the system to consider many more vehicle travel mode options.

As noted above, a corporate vehicle fleet may include a pool of "self-rent" rental vehicles whose use is administered by a rental vehicle service provider. Thus, step 464 may also involve interacting with a reservation booking engine 122 to assess the availability of such pool vehicles. For the purposes of explaining this embodiment, the pool vehicles will be "self-rent" rental vehicles. However, should the pool vehicles be vehicles whose usage the employer administers itself, database 107 is preferably kept up-to-date with the location/status of all vehicles in the employer's pool fleet. Alternatively, where the employer administers usage of the pool vehicles through a third party, step 464 may involve accessing the third party's reservation system.

At step 470 the system computes a set of pre-determined parameters for each vehicle travel mode option. The set of parameters that is computed at step 470 may be customized by the practitioner. For example, the set of parameters may include the parameters shown in vehicle travel mode options data structure 398 shown in FIG. 3I. Cost 364 comprises the total monetary cost for the vehicle travel mode option. Optionally, cost 364 may reflect marginal cost for the vehicle travel mode option, in that sunk costs may be excluded. Cost calculations may be made on the basis of the selected vehicle(s) for the vehicle travel mode option and the total distance traveled. For example, the cost calculation for personal vehicles may involve multiplying the expected distance (e.g., 366) as determined from the vehicle travel mode option (such distance can be determined using any of a number of geographical mapping tools that are known in the art) by the travel reimbursement rate (which can be retrieved from the user profile or systematically-defined). Cost for rental vehicles and fleet vehicles may include estimated fuel costs. As noted above, such fuel cost data can be pre-stored by the system or accessed periodically from a fuel cost data provider. Emissions 365 comprises a value for the total estimated carbon emissions for the vehicle travel mode option, based on the vehicles used in the vehicle travel mode option and distance used. Distance 366 comprises the total estimated distance traveled for the vehicle travel mode option. Employee time 367 allows the value of employee time to be reflected in the selection of vehicle travel mode options. In an exemplary embodiment employee time 367 is computed by multiplying employee time value 325 for each user by the total distance traveled for that user under the vehicle travel mode option.

Returning to FIG. 4A, at step 404 the system selects a travel suggestion from the available vehicle travel mode options (e.g., 398) based on the vehicle travel mode selection rule. In an exemplary embodiment, the system can be configured to create a weighted value (e.g., 368) for each vehicle travel mode option to govern the selection process. Weighted value 368 may be computed on the basis of other parameters (e.g., cost 364, emissions 365, employee time 367) for the vehicle travel mode option utilizing multipliers (e.g. multipliers stored in system variables data structure 380) according to the vehicle travel mode selection rule. This allows selection of travel vehicle travel mode options based on the practitioner's individual weighted concerns for the various parameters. For example, the vehicle travel mode selection rule could indicate that weighted value 368 is calculated by multiplying cost 364 (in dollars) by cost multiplier 384 having a preset value of "10", multiplying emissions 365 (in kg) by emissions multiplier 385 having a value of "0.5", multiplying employee time (unitless) by employee time multiplier 386 having a value of "0.1", and summing the result, as shown in Equation (1). This allows simplicity of logic in selecting a travel suggestion, as the system may be configured to simply suggest the vehicle travel mode option with the lowest weighted value.

$$\text{Weighted value} = 10*\text{cost} + 5*\text{emissions} + 0.1*\text{employee time} \quad \text{Equation (1):}$$

Various rules may be implemented to encourage or discourage the use of specific vehicle types. For example, the system may store a cost multiplier for personal vehicles 387 that is used to modify the cost of all reimbursable personal vehicle travel mode options (or travel routes). For example, by setting personal vehicle multiplier 387 equal to "2", the system would double the estimated cost for all personal vehicle use when computing weighted values. A practitioner may choose to use such a multiplier to reflect the cost of potential liability for accidents involving personal vehicles.

At step 406, the system presents the selected vehicle travel mode option to the associated user(s) for acceptance. This presentation is preferably made through user computer 101 (for example, via email, a graphical user interface (GUI) displayed with a browser executing on the user computer, or via a calendar entry on a user's calendar application executing on the user computer). The selected vehicle travel mode option preferably comprises (1) at least one vehicle identifier, (2) at least one traveler, (3) a date and time for beginning travel, (4) an origin, and (5) at least one destination. However, it may optionally include more or fewer pieces of information. For example, the travel suggestion may comprise a travel path having multiple "legs" or a suggestion that involves multiple travelers and multiple vehicles. For example, the travel suggestion may be "round-trip" and include a date and time for returning to the origin. As another example, in a scenario with multiple travelers sharing a vehicle, the vehicle travel mode option data may include an identification of which traveler or travelers are to serve as the driver(s). The system can be configured to select a driver based on various rules. For example, the lowest level employee may be selected by default as a driver. For travel in a user's personal vehicle, the system would preferably select the vehicle's owner as the driver. Also, the system may be configured to ensure that a driver is assigned to all legs of a travel path in a selected vehicle travel mode option.

It is also worth noting that some of the travelers identified in the vehicle travel mode option may not be users of the system (e.g., employees). For example, a user may identify additional non-company travelers in the travel plan data initially supplied to the system at step 400. It is also worth noting that the travel path of the selected vehicle travel mode option may differ from the travel path defined by the travel plan data received at step 400. For example, the system may be configured to create a travel path to accommodate multiple users in a ride-sharing scenario such that the travel path of the selected vehicle travel mode option includes a modified origination, modified destination, and/or new travel route that was not present in any of original travel plans.

If the user(s) reject the travel suggestion at step 408, then the system proceeds to step 412 for handling the rejection. An exemplary process flow for handling rejection is shown in detail in FIG. 4B. If the user accepts the selected travel option at step 408, then the system proceeds to step 410. Acceptance from the user(s) can be received via any of a number of mechanisms. For example, voting buttons could be provided on a GUI displayed on the user computer(s) or through an email sent to the user(s). If multiple users are part of the selected vehicle travel mode option, then the system can be configured to require acceptance from all users before proceeding to step 410. However, this need not be the case. For example, if one or more users decline (or fail to respond) but at least one user accepts, then the system can be configured to proceed to step 410 (to allocate a vehicle for the user(s) who do accept).

It should be noted that some practitioners may choose to eliminate step 408 from an embodiment of the invention to prevent employees from deviating from system-defined travel arrangements. In an exemplary embodiment, the system may be configured to deliver travel suggestions to users, and proceed to step 410 unless a user rejects the suggestion. The system may be configured to store authority data that indicates whether a user (or group of users) is allowed to reject (or modify) a suggestion. An exemplary data structure 393 for storing such authority data is shown in FIG. 3D, described above.

At step 410, the system allocates a vehicle to the user in accordance with the travel solution. The allocation process may be dependent on the type of vehicle. For example, for a rental vehicle obtained from a rental vehicle service provider, the system may be configured to automatically connect to the rental vehicle service provider's booking engine 122 to book a new rental vehicle reservation.

For a fleet vehicle allocation (in this example, the fleet vehicle is a "self-rent" rental vehicle administered by a rental vehicle service provider), the system is configured, to book a "self-rent" rental vehicle in accordance with the travel solution. TMS software 110 can perform this step by booking an appropriate "self-rent" rental vehicle reservation with the reservation booking engine 122.

For a reimbursable personal vehicle allocation, the system is configured to assign the personal vehicle of the user to the travel solution. The system may also automatically communicate mileage reimbursement data to an employer payroll system, so that employees automatically receive mileage reimbursement. The system may be configured to transmit mileage reimbursement to the payroll system only after receiving user input indicating that travel was actually completed according to the travel solution.

Further at step 410 the system sends a confirmation to the users associated with the travel solution. This confirmation can be made via email or other mechanisms (such as a text message or through a GUI displayed on the user computer).

The TMS software 110 can also be configured to provide users with an opportunity to reject or modify a travel suggestion selected by the system. FIG. 4B depicts an exemplary process flow for such a procedure. At step 430, the system receives a reason from the user for declining the travel suggestion. Preferably, this reason is received in response to user input via a GUI displayed on the user computer 101. Also, such a GUI can be configured to provide the user with a selectable list of pre-defined reasons (e.g., "my personal vehicle is unavailable for this date and time", "my meeting is at the end of the day and I would prefer to drive home after the meeting in my personal vehicle rather than use a rental vehicle", etc.). However, the GUI could also or alternatively be configured to provide a freeform text entry field for the user to supply the reason. The system can be configured to store the received reasons in a database (e.g., database 107) for subsequent analysis.

At step 432, the system can check whether the user has suggested an alternative to the travel suggestion. If not, flow proceeds to step 437. If the user has suggested an alternate solution for the travel suggestion, then at step 434, the system determines whether the user has the authority to create an alternate vehicle travel mode option. For example, the system may query authority data stored in the user profile to determine the user's authority level. If the user has sufficient authority, then flow proceeds to step 436. If the user lacks sufficient authority, then flow proceeds to step 438.

At step 438, the system requests approval for the alternate travel option from a person with appropriate approval authority. For example, the system may be configured to contact a supervisor (e.g. via email) with the user's suggested alternate travel option. In an exemplary embodiment the system is configured to wait a pre-determined amount of time for approval. If approval is received within this pre-determined amount of time (e.g. 24 hours prior to travel), then flow proceeds to step 436. If approval is not received, then flow proceeds to step 410.

At step 436, the system proceeds with the proposed alternate vehicle travel mode option as the travel solution. This alternate solution may be applicable to only the declining user, or to one or more other travelers (e.g. the travelers identified in the suggested travel solution). Flow proceeds to step 410.

E. TMS Access Options

User computers 101 can be configured to access the TMS software 110 through any of a number of techniques. For example, the TMS 100 can be configured to host a website that provides a plurality of graphical user interfaces for display on the user computers to interact with the TMS software 110 as described in connection with FIGS. 2 and 4. In such an embodiment, conventional browser software running on the user computers 101 can be used to access the GUIs on the TMS 100.

Figure 5:
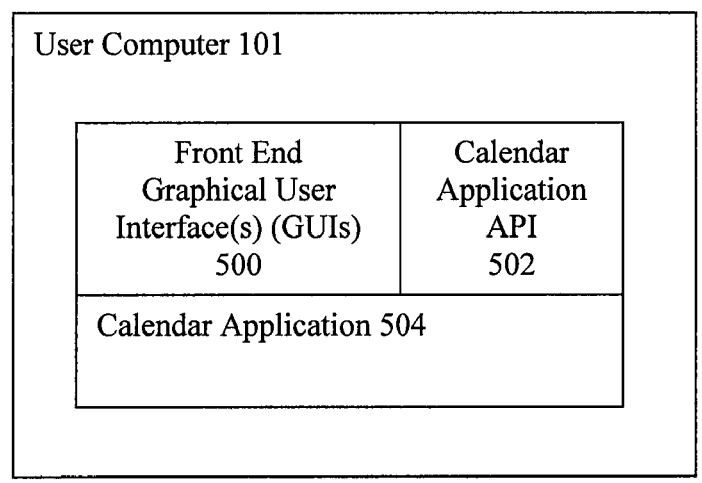
FIG. 5 depicts an example of a user computer interfacing the TMS software in accordance with an embodiment of the invention.

In another embodiment, the TMS software 110 can be accessed via a calendar application (e.g., the well-known OUTLOOK calendaring application provided by MICROSOFT) running on a user computer 101. MICROSOFT and OUTLOOK are federally registered trademarks of Microsoft Corporation, One Microsoft Way Redmond Wash. 98052-6399. An example of this is shown in FIG. 5. The front end GUIs 500 could be deployed on the user computer 100 as a plug-in for use in combination with the calendar application 504 by way of a calendar application API 502 that interfaces the front end GUIs with the calendar application and the TMS software 110. In this manner, when a user schedules a meeting out of the office using the calendar application, the GUIs presented to the user via the calendar application may include options for making travel arrangements through the TMS 100. The inventors believe that embodiments employing the calendar application interface of FIG. 5 can be particularly advantageous because the TMS can be triggered transparently from the users' perspectives to find travel solutions. A user would only need to schedule something on his/her calendar as he/she would normally do in the course of the day, and GUI fields displayed through the calendaring application would prompt the user for any data related to defining a travel plan. Furthermore, the inventors note that the embodiment of FIG. 5 can be particularly useful in scenarios where the user computer 101 is a mobile device such as a mobile telephone.

In yet another embodiment, the TMS software 110 can be installed as a standalone application on the user computers 101. With such an embodiment, it is preferred that the different TMS software programs 110 on each user computer be configured to access a common database 107 over the network 103 to more reliably ensure synchronization between data in the database 107. However, this need not be the case.

F. TMS Usage Example

An exemplary use of an embodiment of the invention will now be described in the form of a detailed fictional example involving ACME corporation and its employees: Alice, Bob, Cindy, and David.

ACME corporation implements an embodiment of the invention such as that described in connection with FIGS. 4A-D and FIG. 5 by installing the TMS software 110 on a server accessible to user computers within ACME's intranet (and installing an appropriate plug-in to its calendaring application). ACME instructs employees to create profiles on the TMS system.

Alice, Bob, Cindy, and David are employed by ACME corporation and typically work in office Corporate office (Q). All four employees connect to the TMS system via web browser software to create user profiles. Each user enters a home address, typical work location(s), and typical working hours (by day-of-week). Home address data may be stored in locations data structure 394 shown in FIG. 3E. The system also requests contact information comprising email address and mobile phone number. Each user also creates a "friends" list. Alice, Bob, and Cindy all add each other as "friends" in the system. For example, Alice invites Bob to be friends and Bob accepts via TMS web pages. User profile data for this example is shown in FIG. 3A. Each user also enters information about the user's personal vehicle, such as make, model, seating capacity, etc. Vehicle data for this example is shown in FIG. 3C.

A system administrator creates levels data structure 393 shown in FIG. 3D, which defines authority for various user levels as described above.

Figure 7:
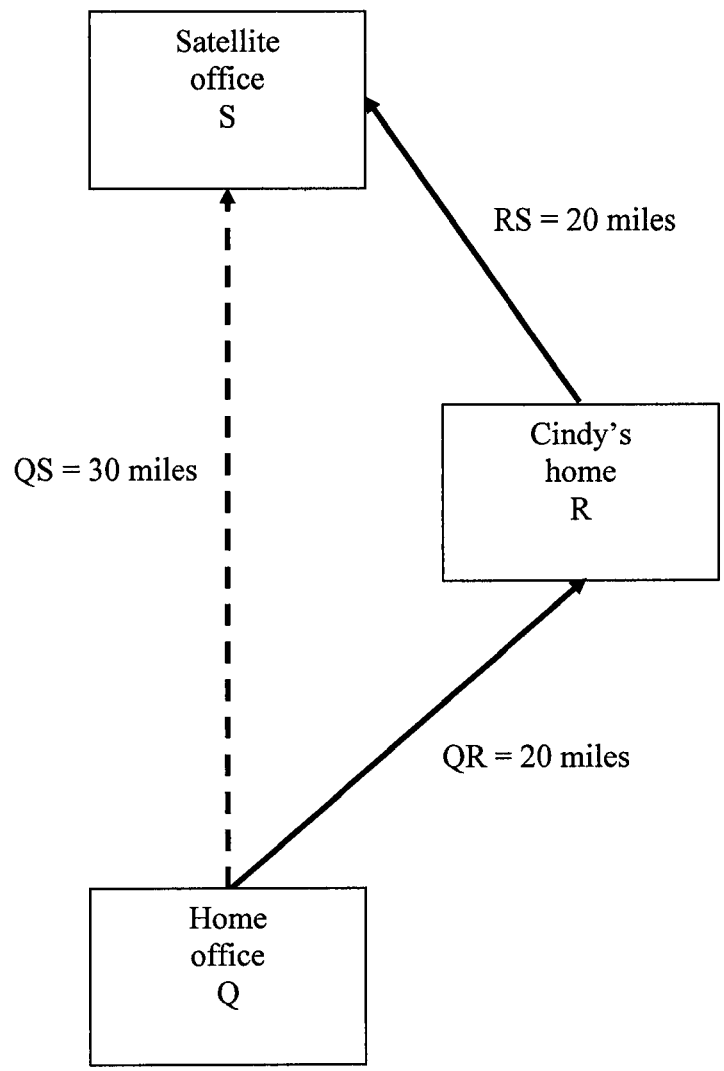
FIG. 7 depicts an exemplary travel path for multiple users that can be accommodated by exemplary embodiments of the invention.

On January 14, Alice and Bob will attend a meeting from 3:00 pm-4:30 pm at office Satellite office (S), which is 30 miles from Corporate office (Q). Cindy must attend a different meeting from 3:15 pm-4:15, also at Satellite office (S). Cindy will be at Cindy's home (R), 20 miles from Satellite office (S), prior to the meeting. A diagram of locations Q, R, and S is shown in FIG. 7. Data for these locations is shown in FIG. 3E. David is the organizer of the 3:00 pm meeting. At step 400, on January 10, David enters the meeting information into an appointment management software program (ACME uses MICROSOFT OUTLOOK for appointment management), including date (January 14), time (3:00 pm-4:30 pm), and meeting location (Satellite office (S)). David sends a meeting invitation to Alice and Bob via MICROSOFT OUTLOOK. TMS software 110 receives the meeting data from MICROSOFT OUTLOOK, as described with reference to FIG. 5. The system retrieves David's user profile and finds that David's default location 305 at the time and date of the meeting is location S (the meeting location). In an exemplary embodiment, the system automatically prompts David (e.g., through an email or other GUI display) with an inquiry as to whether David will require travel assistance for the meeting, the prompt including "Yes" and "No" voting options. Because David plans on being at Satellite office (S) already at the time of the meeting, he declines by voting "No".

Alice is the first to accept David's meeting invitation on January 10. When Alice accepts the invitation in MICROSOFT OUTLOOK it creates an appointment in her calendar, and the plug-in is configured to alert the TMS software 110 of this appointment. The system automatically retrieves the information for Alice's appointment and sends an automated email to Alice inquiring whether she would like travel assistance. Alice accepts by selecting a URL in the email that opens a web browser that connects to TMS system 105. This URL is programmed to take Alice directly to a TMS web page for making travel arrangements for this particular meeting. The user-input fields comprise origin, destination, departure time for the first leg of the trip, and departure time for the second leg of the trip. An exemplary TMS web page GUI for Alice's travel plan entry is depicted in FIG. 6A. In the embodiment of FIG. 6A, user-input fields comprise origin, depart time 1, destination 1, round-trip checkbox, depart time 2, destination 2, vehicle, driver, and additional travelers fields.

Alice's user profile indicates that the system should presume that Alice's origin is her home address on weekdays before 9:00 am, and that her default origin should be her customary office address after 9:00 am on weekdays. Because the meeting begins during Alice's typical working hours at 3:00 pm, the system pre-populates the origin field with her typical work location (Corporate office (Q)) as shown in FIG. 6A. (If the meeting had been scheduled for 9:00 am or earlier, the system would have used Alice's home address as the default origin). "Destination 1" is also pre-populated with the meeting location (Satellite office (S)). The departure time for the first leg is pre-populated by default based on the estimated travel time. In this case, the distance between Corporate office (Q) and Satellite office (S) is 30 miles, so the TMS system pre-populates this field at 45 minutes prior to the start of the meeting (2:15 pm). The departure time for the second leg is pre-populated by default at 15 minutes after the end of the meeting (4:45 pm). Alice has the option to change any of these fields, but in this case it is all correct so she leaves all fields at default values. The TMS GUI also asks whether Alice is able and willing to drive her personal vehicle to the meeting, to which Alice responds affirmatively by selecting her personal vehicle in the "Vehicle" field and "Alice" in the "Driver" field. The TMS system computes a travel path from Alice's origin to her destination and stores all of the travel information in database 107. Alice's travel plan (P1) is shown in the first row of travel plans data structure 395 shown in FIG. 3F.

In this example, ACME has configured its TMS system to wait until two days prior to travel to generate travel suggestions. Thus, the system notes that the travel plan is for travel on January 14, and waits until January 12 to generate a suggestion. However, it should be understood that alternate timing arrangements could be employed (such as immediately generating a travel suggestion).

Bob completes a similar process on January 11. An exemplary TMS web page GUI for Bob's travel plan entry is depicted in FIG. 6B. Bob's travel plan (P2) is shown in the second row of travel plans data structure 395.

Also on January 11, Cindy logs in to TMS system 100 via a web browser and manually enters her meeting information for January 14. An exemplary TMS GUI for Cindy's travel plan entry is depicted in FIG. 6C. The TMS system retrieves Cindy's user profile to assist with pre-populating the fields. Because the meeting begins during Cindy's typical working hours at 3:00 pm, the system pre-populates the origin field with her typical work location (Corporate office (Q)). Destination 1 is also pre-populated with the meeting location (Satellite office (S)). In this case, the distance between Corporate office (Q) and Satellite office (S) is 30 miles, so the TMS system pre-populates this field with 2:30 pm (45 minutes prior to the start of the meeting at 3:15 pm). The departure time for the second leg is pre-populated by default at 4:30 pm (15 minutes after the scheduled end of the meeting at 4:15). However, Cindy plans on working from home for most of the day on January $14^{th}$. Cindy changes the "origin" and "destination 2" fields to her home address by selecting the drop-down in the corresponding select boxes. (Cindy's home address is available as an option because the TMS system retrieved it from her user profile). Cindy's home (R) is 20 miles from Satellite office (S), as determined from commercially available mapping applications. The system automatically re-calculates a new travel path from Cindy's home to Satellite office (S), and (based on the shorter distance) updates the departure time for the first leg to 2:40 pm (35 minutes prior to the start of the meeting at 3:15). An example of the updated TMS web page GUI is shown in FIG. 6D. Cindy indicates that she can drive her personal vehicle and submits the form. Cindy's travel plan is shown in the third row of travel plans data structure 395.

On January 12 the system proceeds to generate a travel suggestion for all travel plans for January 14. At step 402 the TMS system searches for ride-share opportunities. At step 440 the system retrieves stored travel plans (P1, P2, P3). At step 442 the system identifies a designated user group for each travel plan. As can be seen in designated user groups data structure 391, ACME has designated that all level 1 employees share designated user group (D1), while level 2 and 3 employees share designated user group (D2). Thus, Alice, Bob, and Cindy are assigned to designated user group (D2).

Since Alice, Bob, and Cindy are all in the same designated user group (D2), their travel plans are grouped together as a potential ride-share. At step 444 the system compares the date/time for each travel plan in the potential ride-share group. Travel plans P1 and P2 have identical date/time and are grouped together. Travel plan P3 has a first date/time that is 0:15 difference from P1 and P2, and a second date/time that is 0:15 difference from P1 and P2. ACME has set its date/time difference threshold for ride-shares 326 equal to 0:20 for level 3 users, as shown in FIG. 3C. Since 0:15 is less than 0:20, the system finds a proximate date/time match and groups travel plans P1, P2, and P3 together. At step 446 the system compares the origin and destination of the travel plans in the potential ride-share group to determine whether there is a proximate match. Travel plans P1 and P2 have identical origin and destination, and are therefore grouped together. Travel plans P1, P2, and P3 all have identical destination 1, but their origins and second destinations are different. Travel plan P3's origin is Cindy's home (R), which is 20 miles from Corporate office Q, the origin for P1 and P2. ACME has set a global ride-share distance threshold equal to 30 miles for all users. This constraint serves to keep computation reasonable by limiting the number of ride-share groups that will be considered. At step 446 the system determines that the distance between Q and R is 20 miles, and therefore within the threshold. Thus, the system determines that travel plans P1, P2, and P3 should be grouped as ride-share group G1, as shown in FIG. 3G.

At step 403 the system generates a list of available travel options, as shown in detail in FIG. 4D. At step 460 the system selects ride-share group G1. At step 462 the system computes possible travel paths that will satisfy all travel plans for group G1, i.e. plans P1, P2, and P3. The system analyzes the distances involved and calculates the possible routes as shown in FIG. 3H. A first possible path is for Cindy to drive from R to Q, pick up Alice and Bob, and drive to S for the meeting, then back to Q to drop off Alice and Bob, and then back to R. This travel path comprises travel routes R1-R4 in FIG. 3H. A second possible path is for Alice and Bob to drive to R to pick up Cindy, drive to S for the meeting, then back to R to drop off Cindy, then back to Q. This travel path comprises travel routes R5-R8 in FIG. 3H.

In an exemplary embodiment wherein vehicle travel mode options are generated for all sub-combinations of ride-share groups, the system would also identify travel routes R9-R11 shown in FIG. 3H. Cindy's solo (non ride-share) route option is for Cindy to drive alone from R to S, then back to R. This option is reflected by R9 and R10. The total distance for this path is 40 miles. A route option for Alice and Bob is to drive together from Q to S, then back. This option is reflected by R11 and R12. The total distance for this path is 60 miles. For the purposes of this example, travel options will not be generated for these travel paths.

In loop 472 the system identifies available vehicles for each travel path. For the first travel path (routes R1-R4), the system identifies the path origin as R (based on the origin for the first route R1 in the path). At step 464 the system retrieves a list of available fleet vehicles at location R from vehicles data structure 392. Because there are no fleet vehicles located at Cindy's home, the retrieved list is null. The system further checks travel solutions data structure 399 to determine whether any vehicles are scheduled to arrive or depart from location R during the relevant time period, and finds none. At step 466 the system retrieves a list of personal vehicles available at location R, which comprises Cindy's vehicle V3. The system notes that vehicle V3 has a capacity sufficient to transport all 3 users associated with this travel path. At step 468 the system connects to a rental vehicle reservation system via the internet and receives a price quote for a rental vehicle V6 that is available to be delivered to location R. The system stores associated data for the rental vehicle V6 in data structure 392 as shown in FIG. 3C. The system notes that vehicle V6 has a capacity sufficient to transport all 3 users associated with this travel path.

Still in loop 472, the system determines vehicles available for the second travel path (routes R5-R8). For the second travel path (routes R5-R8), the system identifies the path origin as Q (based on the origin for the first route R5 in the path). At step 464 the system retrieves a list of available fleet vehicles at Q from vehicles data structure 392. This list comprises vehicles V4, and V5. The system further checks travel solutions data structure 399 to determine whether any vehicles are scheduled to arrive or depart from location Q during the relevant time period, and finds none. The system notes that vehicle V5 has a capacity sufficient to transport all 3 users associated with this travel path, but vehicle V4 does not.

At step 466 the system retrieves a list of personal vehicles available at location Q, which comprises vehicles V1 and V2. The system notes that vehicles V1 and V2 have a capacity sufficient to transport all 3 users associated with this travel path. At step 468 the system connects to a rental vehicle reservation system via the internet and receives a price quote for a rental vehicle V7 that is available to be delivered to location Q. The system stores associated data for the rental vehicle V7 in data structure 392 as shown in FIG. 3C. The system notes that vehicle V7 has a capacity sufficient to transport all 3 users associated with this travel path.

At step 470 the system computes various parameters for each vehicle travel mode option, as shown in exemplary vehicle travel mode option data structure 398. Vehicle travel mode options O1 and O2 correspond to the first travel path (routes R1-R4) while vehicle travel mode options O3-O6 correspond to the second travel path (routes R5-R8). For vehicle travel mode option O1, distance 366 is computed as the sum of distances for travel routes R1-R4, i.e. 20+30+30+20=100 miles.

For vehicle travel mode option O1, utilizing vehicle V3, the cost 364 is computed as $0.60/mile multiplied by the total distance traveled 366, i.e. $0.60/mile*100 miles=$60.00. Emissions 365 is computed as 250 g/mile*100 miles=25,000 g=25 kg. Employee time 367 is computed as the sum of employee time values for each route R1-R4. Cindy is level 3 so her time value is 20. Alice and Bob are level 2 so their time value is 10. For option O1, employee time 367=20*100 (Cindy)+10*60 (Alice)+10*60 (Bob)=3200. ACME has adopted the following formula for calculating weighted value 368: Weighted value=10 cost+5*emissions+0.1*employee time (as shown in system variables data structure 380). Thus, the weighted value 368 for option O1 is 10*60+5*25+0.1*3200=600+125+320=1045.

For vehicle travel mode option O2 the calculations are identical except that the vehicle data is different. Cost 364 for vehicle V6 is $40 flat plus an estimated $0.10/mile for fuel. Thus, the total cost for option O2 is $40+$0.10/mile*100 miles=$40+$10=$50. Estimated emissions 365 for O2 is 50 g/mile*100 miles=5,000 g=5 kg. Employee time is identical to O1. Thus, for option O2 the weighted value 368 is: 10*50+ 5*5+0.1*3200=500+25+320=845.

For vehicle travel mode option O3 the travel path is R5-R8, and the vehicle is V1. Calculations are similar to those described above. The results are shown in data structure 397 in FIG. 3I.

As can be seen, vehicle travel mode option O5 has the lowest weighted value 368. Thus, at step 404 the system selects vehicle travel mode option O5 as the travel suggestion. At step 406 the system delivers this suggestion to all associated users. As can be seen from FIG. 3D, ACME does not allow level 2 employees to modify or reject travel suggestions. Thus, Alice and Bob are required to comply with the travel suggestion. However, Cindy is level 3 and therefore has the authority to modify or reject a travel suggestion. Thus, when delivering the suggestion to Cindy, e.g. via email, the system may include a link to reject or modify the suggestion.

At step 408 Cindy selects the "modify travel suggestion" URL in the travel suggestion email. A web browser opens on Cindy's computer and connects to the TMS system. An exemplary GUI for modification to the selected travel suggestion is shown in FIGS. 6E1-6E2. For example, Cindy could choose a different vehicle using the "Vehicle" select box. Cindy could also choose to remove herself from the travel suggestion by selecting the "Remove me from this travel option" link. This would remove Cindy from this travel suggestion in the system and the system would proceed to rejection handling step 412.

Suppose Cindy chooses to remove herself, thereby triggering rejection handling 412. At step 430 the system requests a reason for Cindy's rejection of the suggestion. At step 432 the system notes that Cindy did not propose an alternate option (e.g., by modifying the fields in FIGS. 6E1-E2), but removed herself completely from the travel suggestion. Thus, the system proceeds to step 437. At step 437 Cindy's non-compliance with the travel suggestion is stored in database 107 for future analysis. For example, the system may store the various parameters (cost, emissions, employee time, etc.) for the travel suggestion for comparison to data indicative of the travel solutions that were actually employed.

The system recalculates new vehicle travel mode options for Alice and Bob, with Cindy excluded from the ride-share group. The system will deliver a new suggestion to Alice and Bob.

However, another scenario may be that Cindy decides not to remove herself from the travel suggestion. Instead she decides not to make any modifications and accepts the suggestion without any changes.

At step 410 the system allocates vehicles for travel and sends confirmation (e.g. via email) to associated users. In this case, the system allocates fleet vehicle V5, to be driven by Alice according to vehicle travel mode option O5.

At step 414, after the scheduled date of travel, the TMS system sends a follow-up email to request confirmation that all travelers actually took part in the travel, and requesting data describing any deviations that took place.

As explained below, with a preferred embodiment, ACME's travel supervisors are able to view reports on the data generated by this example. For example, suppose Cindy had in fact rejected the travel suggestion. Travel supervisors would be able to view a non-compliance report that would indicate that Cindy declined to use the suggested rental. Preferably, after follow-up step 414, the system would compute the various parameters for the travel that actually occurred. This allows the system to compute a difference in each parameter (cost, emissions, employee time) between the travel suggestions and the actual travel that occurred. Thus, the system can generate reports describing the savings (e.g., in cost, emissions, employee time) that have been actually realized (versus a system with no ride-sharing), savings that would have been realized if all travel suggestions had been followed, etc.

Suppose that Alice, Bob, and Cindy actually travel according to the travel suggestion O5, and confirm this with the system at step 414. A cost savings report would indicate that by ride-sharing, Alice, Bob, and Cindy saved approximately $48.00 versus a scenario in which all 3 drove separately and requested mileage reimbursement. Alice and Bob driving separately would have cost $36.00×2=72.00. Cindy driving separately would have cost $24.00, for a total non ride-share cost of $96. Instead, the cost to ACME was $20 in fuel costs (and perhaps maintenance) for fleet vehicle V5, for a savings of nearly 80%. The system will also report that the ride-sharing resulted in a savings of 80 vehicle miles traveled. (Alice and Bob driving separately would have been 60×2=120 miles. Cindy driving separately would have been 40 miles, for a total of 160. Instead, the total vehicle miles traveled was 80 miles). Reports may also indicate the environmental savings in the form of reduced carbon emissions. In this example, in a non-ride-share scenario Alice's vehicle would have emitted 150 g/mile*60 miles=9 kg CO2. Bob's vehicle would have emitted 300 g/mile*60 miles=18 kg CO2. Cindy's vehicle would have emitted 250 g/mile*40 miles=10 kg CO2. The estimated total CO2 emitted would have been 37 kg CO2. Instead, vehicle V5 emitted an estimated 100 g/mile*80 miles=8 kg CO2. Thus, a savings of 29 kg of CO2 emissions was realized, for a nearly 80% reduction.

G. Courier Service

The TMS 100 may also be configured to include package courier options. For example, if a package needs to be delivered from location A to location B, a user can enter this package delivery data into the TMS system 105, using any of the methods described above. The TMS system would then search for any confirmed travel solutions wherein the travel path is from location A to location B (or similar path). If a matching travel path is found, the system would send a request to a user in the corresponding travel solution to pick-up and deliver the package. The user can respond using any of the methods described above. If no matching travel solution is found, the system may be configured to create a new travel plan to achieve the delivery, e.g., for a user who is a delivery driver.

H. Recurring Trips

In an exemplary embodiment, the system is configured to allow users to create recurring travel plans. For example, a user having a weekly meeting at the same location could indicate the recurring nature of the meeting within the TMS system. Thus, the system would automatically create travel suggestions for the meeting every week.

I. Search Existing Travel

In an exemplary embodiment, the system can be configured to allow users to search for existing travel solutions (e.g. data structure 399) that they can then join. For example, a user may wish to simply enter a destination (or an origin and destination) for a particular date (or date range) to view all scheduled travel solutions within those constraints to identify whether there is an already-existing travel solution that the user can join. The ability to view other user's travel information may depend on user level. For example, level 2 users may only be able to see travel information for other users level 2 and below. The search feature may allow users to limit search results to travel solutions having a specified status. System administrators may be able to see (and modify) all travel information for any user.

In an exemplary embodiment, the system would allow a user to request to join an existing travel solution (confirmed travel option). This would allow users with flexible plans to search for travel that is already scheduled, find a travel solution with available seating capacity, and request to join that solution. By using this feature, a user does not need to enter their travel plan data into this system (or need only enter a reduced amount of travel plan data), and also increases efficiency by joining a travel solution that was already planned. An additional user may be added to a travel solution without modifying the existing travel solution data (beyond adding another passenger).

J. Billing

The system may be configured to automatically communicate mileage reimbursement information to a payroll system, so that employees can be automatically reimbursed for business travel.

The system, if desired by a practitioner, may also be configured to allow employees to use an employer's fleet of vehicles for personal use for a price. For example, an employee may allow employees to use fleet vehicles on a fractional/hourly basis, and automatically communicate the charges for such use to a billing/payroll system.

K. Reports

The travel management system may be further configured to generate various reports. Reports may be organized by, e.g., date range, type of vehicle (hourly rental vehicle, leased vehicle), private vs. business use, etc. Data for these reports can be obtained through analysis of the data structures discussed above in connection with FIGS. 3A-K.

For example, the system may be configured to generate reports on efficiencies achieved through ride-sharing, such as reduced cost and reduced greenhouse fuel emissions. Reduced monetary cost of ride-sharing may be configured to include reduced travel costs as well as reduced parking costs (for example, if users ride-share to the airport and use long-term parking). The system may also report on package delivery costs saved by use of the courier service option.

The system may also report on sub-optimal utilization and generate reports on costs that could be avoided in the future by adjusting the size of a leased vehicle fleet. For example, if "sunk-cost" vehicles are going un-utilized, then a smaller fleet may be more cost-effective. Likewise, if employees are frequently using retail rental vehicles or mileage reimbursement options because the existing fleet vehicle inventory is already in use, then a larger fleet of sunk cost vehicles (e.g. leased vehicles or "self-rent" rental vehicles) may be more cost-effective.

The system may also report on "non-compliance" by users, i.e. instances where users decline travel suggestions. These reports may be organized by user, additional resulting cost of travel, etc.

In an exemplary embodiment, the system is configured to export reports and billing information to third-party financial software. For example, reports could be exported in a .csv (comma separated values) format.

In an exemplary embodiment, the system allows users (e.g. administrators) to customize report data. For example, the system may allow a user to select the data that the user would like in the report, and then create a custom report.

The system can be configured to allow a user (e.g. administrator) to create various user-defined reports.

FIG. 9A depicts an exemplary efficiency report for a fictional company for a month of fictional data. The report displays "actual" travel based on stored data indicative of completed travel for the time period, "suggested" travel based on travel suggestion data, and "worst-case" travel. Worst case travel data may be based on various system-defined assumptions (e.g., that no ride-sharing occurred, that users always drive personal vehicles when available, etc.). Other assumptions are possible, and may be defined by a system administrator. Also, the cost of fleet vehicles may be added to the total costs computation. For example, if ACME pays a monthly fee to a rental vehicle service provider for each fleet vehicle, then these monthly fees would be summed and included in total cost 901, in addition to the aggregate cost for all completed travel.

FIG. 9B depicts two exemplary comparison reports: one for weighted value and one for emissions. These reports provide percentage differences between the three categories. For example, by looking at the emissions comparison report of FIG. 9B, a user could quickly see that ACME's actual travel resulted in 142.98% of the emissions versus a scenario in which all suggestions were actually implemented. Thus, by following all suggestions the company could have reduced its emissions by about 30%.

FIG. 9C1 depicts an exemplary report showing an overview of declined travel suggestions, broken down by department. This report allows the user to quickly identify which departments are responsible for the most declined travel suggestions, and to easily see the consequences of the declines in terms of e.g., cost, emissions, employee time, and weighted value. FIG. 9C2 allows a user to quickly identify the users responsible for the most declined travel suggestions. A company may wish to follow up with these users to encourage them to accept travel suggestions more often.

K.1: Simulation Reports

In an exemplary embodiment, the system can also be configured to run simulations in response to user input. In a simulation, the system would preferably be configured not to send any emails or communicate with users. Instead, the simulation mode would be used to generate vehicle travel mode options for hypothetical input data for a user-defined period of time. The system may be configured to perform simulations according to the same rules that govern normal operation, and generate reports showing possible travel options for the hypothetical data.

For example, suppose the system described herein has been installed at ACME corporation for the entire month of January, 2009. ACME corporation may want to know what the impact of a proposed change to their fleet would have been, based on the actual travel data for January. ACME could use the simulation feature to create reports comprising estimated cost, emissions, and employee time data for a hypothetical fleet change. For example, suppose ACME would like to know what the impact of adding an additional hybrid vehicle to its vehicle fleet would be. ACME could run a simulation wherein the system generates vehicle travel mode options for this hypothetical. First, the system would load the actual travel plan data (e.g. data structure 395) previously stored for January. Next, the system would load the vehicle data (e.g. data structure 392), and make the user-defined hypothetical changes, e.g. by adding a hybrid vehicle to the fleet. The system would then perform a simulation by generating vehicle travel mode options as described in detail above. The system may be configured to presume, for the simulation, that all travel suggestions will be accepted and implemented by users (and thus travel suggestions automatically become travel solutions), and that all travel solutions will be implemented according to plan (and thus travel solutions are automatically marked completed). Next, the system generates various reports according to user input. This simulation reporting functionality may be identical to the reports generated for normal operation of the system, but preferably all of the reports would be marked "simulation" to prevent confusion.

The simulation feature is not limited to testing the effects of proposed vehicle changes. For example, the simulation feature may be used to test the impact of proposed changes to designated user groups (e.g. 391), employee levels (e.g. 393), employee time values (e.g. 325), system rules, and system variables (e.g. in data structure 380).

FIG. 9D depicts an exemplary simulation report. It allows a user to quickly see the impact of various proposed changes. In the example shown in FIG. 9D, simulation 1 corresponds to adding a Toyota Prius to ACME's vehicle fleet, simulation 2 corresponds to removing a Ford Mustang from ACME's vehicle fleet, and simulation 3 corresponds to changing the value of cost multiplier (384) from "10" to "8". The system assumes that all travel suggestions will be implemented when calculating the simulation data. Thus, a user can quickly see the impact of a proposed change relative to current parameters. Using the simulation feature, a user can simulate a proposed change and see the results before actually implementing the change in the real world or in the "live" system.

While the present invention has been described above in relation to its preferred embodiment, various modifications may be made thereto that fall within the invention's scope, as would be recognized by those of ordinary skill in the art. Such modifications to the invention will be recognizable upon review of the teachings herein by those of ordinary skill in the art. As such, the full scope of the present invention is to be defined solely by the appended claims and their legal equivalents. It should be understood that the embodiments disclosed herein include any and all combinations of features described in any of the dependent claims.

What is claimed is:

1. A system for managing vehicle travel, the system comprising:
a processor configured execute a travel management software application, the travel management software application configured to (1) receive data from a user that represents a plan to travel by vehicle, wherein the vehicle travel plan data comprises an origin and a destination, (2) determine a distance for the vehicle travel plan based at least in part on the received vehicle travel plan data, (3) retrieve vehicle travel mode data for a plurality of vehicle travel modes that satisfy the vehicle travel plan based at least in part on the received vehicle travel plan data, wherein the vehicle travel modes comprise a rental vehicle travel mode and a reimbursable personal vehicle travel mode, (4) compute a monetary cost for a rental vehicle based on the vehicle travel plan data and the retrieved vehicle travel mode data, the computed monetary cost for the rental vehicle being associated with a first vehicle travel mode option, the first vehicle travel mode option corresponding to travel by the rental vehicle from the origin to the destination in accordance with the vehicle travel plan, (5) compute a data value for another parameter for the rental vehicle based on the vehicle travel plan data and the retrieved vehicle travel mode data, the another parameter comprising a parameter other than monetary cost, the computed another parameter data value for the rental vehicle being associated with the first vehicle travel mode option, (6) compute a normalized cost for the first vehicle travel mode option as a weighted combination of the computed monetary cost and the computed another parameter data value for the rental vehicle, (7) compute a monetary cost for a reimbursable personal vehicle based on the vehicle travel plan data, the determined distance, and the retrieved vehicle travel mode data, the computed monetary cost for the reimbursable personal vehicle being associated with a second vehicle travel mode option, the second vehicle travel mode option corresponding to travel by the reimbursable personal vehicle from the origin to the destination in accordance with the vehicle travel plan, (8) compute a data value for the another parameter for the reimbursable personal vehicle based on the vehicle travel plan data and the retrieved vehicle travel mode data, the computed another parameter data value for the reimbursable personal vehicle being associated with the second vehicle travel mode option, (9) compute a normalized cost for the second vehicle travel mode option as a weighted combination of the computed monetary cost and the computed another parameter data value for the reimbursable personal vehicle, and (10) make a selection as between the first vehicle travel mode option and the second vehicle travel mode option according to a vehicle travel mode selection rule based on the computed normalized costs for the first and second vehicle travel mode options.

2. The system of claim 1 wherein the retrieved vehicle travel mode data comprises a reimbursement rate applicable to the reimbursable personal vehicle travel mode and a monetary rental cost associated with the rental vehicle travel mode.

3. The system of claim 2 wherein the processor is in communication with a rental vehicle reservation booking engine associated with at least one rental vehicle service provider, and wherein the travel management software application is further configured to retrieve the monetary rental cost associated with the rental vehicle travel mode by requesting and receiving monetary rental cost data from the reservation booking engine.

4. The system of claim 3 wherein the travel management software application is further configured to book a rental vehicle reservation through the rental vehicle reservation booking engine at least partly in response to the selection of a rental vehicle travel mode.

5. The system of claim 3 wherein the received vehicle travel plan data comprises temporal data for the vehicle travel plan, and wherein the travel management software application is further configured to (1) provide the temporal data to the rental vehicle reservation booking engine for use by the rental vehicle reservation booking engine to determine the monetary rental cost associated with the rental vehicle travel mode.

6. The system of claim 5 wherein the travel management software application is further configured to (1) determine a fuel cost rate, and (2) for at least the rental vehicle travel mode, (i) determine data representative of fuel consumption for the rental vehicle as a function of the determined distance, and (ii) determine as part of the monetary rental cost associated with the rental vehicle travel mode a component thereof attributable to fuel costs based on the determined fuel cost rate and the determined fuel consumption data.

7. The system of claim 6 wherein the processor is in communication with an external source of fuel cost rate data, and wherein the travel management software application is further configured to access the external fuel cost rate data source to determine the fuel cost rate.

8. The system of claim 1 wherein the received vehicle travel plan data further comprises a date and time for the vehicle travel plan.

9. The system of claim 1 wherein the processor is in communication with a geographic information system (GIS), and wherein the travel management software application is further configured to access the GIS to determine the distance based at least in part on the received vehicle travel plan data.

10. The system of claim 1 wherein the processor is in communication with a memory, and wherein the travel management software application is further configured to (1) receive data from a plurality of users that represents a plurality of plans to travel by vehicle, (2) store the received data for the vehicle travel plans in the memory, and (3) process the stored data for the vehicle travel plans to identify potential ridesharing opportunities between a plurality of the users.

11. The system of claim 10 wherein the memory is configured to store a plurality of data fields for a plurality of vehicle travel plans, the data fields comprising the origin, the destination, a date, a start time and an end time, and wherein the travel management software application is further configured to process the data fields to identify the potential ridesharing opportunities.

12. The system of claim 11 wherein the travel management software application is further configured to require that a potential ridesharing opportunity between different users' travel plans share an exact match in the destination fields of the different users' travel plans.

13. The system of claim 12 wherein the travel management software application is further configured to require that a potential ridesharing opportunity between different users' travel plans share an exact match in the origin fields of the different users' travel plans.

14. The system of claim 12 wherein the travel management software application is further configured to, for at least a plurality of travel plans that share the same destination but do not share the same origin, (1) determine a distance between the different origins, and (2) require that a potential ridesharing opportunity between different users' travel plans share a proximate match in the origin fields of the different users' travel plans, wherein the proximate match is based at least in part on a predetermined threshold associated with the determined distances between the origins.

15. The system of claim 14 wherein the processor is in communication with a geographic information system (GIS), and wherein the travel management software application is further configured to access the GIS to determine the distances between the origins.

16. The system of claim 15 wherein the travel management software application is further configured to, for at least a plurality of travel plans that share the same origin but do not share the same destination, (1) determine a distance between the different destinations, and (2) require that a potential ridesharing opportunity between different users' travel plans share a proximate match in the destination fields of the different users' travel plans, wherein the proximate match is based at least in part on a predetermined threshold associated with the determined distances between the destinations.

17. The system of claim 16 wherein the processor is in communication with a geographic information system (GIS), and wherein the travel management software application is further configured to access the GIS to determine the distances between the destinations.

18. The system of claim 11 wherein the travel management software application is further configured to require that a potential ridesharing opportunity between different users' travel plans share an exact match in the origin fields of the different users' travel plans.

19. The system of claim 11 wherein the travel management software application is further configured to require that a potential ridesharing opportunity between different users' travel plans share an exact match in the date fields of the different users' travel plans.

20. The system of claim 19 wherein the travel management software application is further configured to require that a potential ridesharing opportunity between different users' travel plans share an exact match in the start time fields of the different users' travel plans.

21. The system of claim 20 wherein the travel management software application is further configured to require that a potential ridesharing opportunity between different users' travel plans share an exact match in the end time fields of the different users' travel plans.

22. The system of claim 19 wherein the travel management software application is further configured to, for at least a plurality of travel plans that share the same date but do not share at least one of the same start and end times, (1) determine a time difference between at least one of the different start times and end times, and (2) require that a potential ridesharing opportunity between different users' travel plans share a proximate match in at least one of the start time and end time fields of the different users' travel plans, wherein the proximate match is based at least in part on a predetermined threshold associated with the determined time differences.

23. The system of claim 19 wherein the memory is configured to store a plurality of data values in association with a plurality of the users, wherein the data values are representative of an assessment as to how valuable each associated user's time is, and wherein the travel management software application is further configured to determine the ridesharing opportunities among the users based at least in part upon the stored data values.

24. The system of claim 23 wherein the memory is further configured to store a plurality of user profiles, each user profile associated with a user and configured to store the data value for that user.

25. The system of claim 10 wherein the travel management software application is further configured to store data in association with a plurality of users which controls whether those users are eligible for consideration together as part of a ridesharing opportunity.

26. The system of claim 25 wherein the memory is further configured to store a plurality of user profiles, each user profile associated with a user and configured to store the data that controls the user's eligibility for pairing with other users in a ridesharing opportunity.

27. The system of claim 10 wherein the travel management software application is further configured to define a plurality of designated user groups, each designated user group comprising a plurality of users who are eligible for ridesharing opportunities with each other.

28. The system of claim 10 wherein the travel management software application is further configured to (1) receive data from a user that is indicative of a package that need to be delivered to a destination, and (2) process the stored data for the vehicle travel plans to identify a potential ridesharing opportunity between at least one user and the package for delivery of the package to the destination.

29. The system of claim 1 further comprising a memory in communication with the processor, wherein the memory is configured to store a user profile associated with the user, and wherein the travel management software application is further configured to retrieve at least a portion of the vehicle travel mode data from the user profile.

30. The system of claim 29 wherein the user profile is configured to store data representative of a reimbursable personal vehicle travel mode for the user.

31. The system of claim 1 wherein the processor is further configured to execute a calendar software application, and wherein the processor is further configured to execute the travel management software application in response to input received from a user through the calendar software application such that the travel management software application receives the vehicle travel plan data in response to user input via a graphical user interface accessed through the calendar software application.

32. The system of claim 1 wherein the available vehicle travel modes further comprise a fleet vehicle travel mode.

33. The system of claim 32 wherein the processor is further configured to determine whether a fleet vehicle for the fleet vehicle travel mode is available for use to satisfy the vehicle travel plan, and wherein the vehicle travel mode selection rule is configured to (1) select the fleet vehicle travel mode if a fleet vehicle is determined to be available for use, and (2) if no fleet vehicle is determined to be available for use, select as between the rental vehicle travel mode and the reimbursable personal vehicle travel mode based on the computed normalized costs for the rental vehicle travel mode and the reimbursable personal vehicle travel mode.

34. The system of claim 1 further comprising a memory for access by the processor, the memory configured to store a plurality of data structures that comprise data about a plurality of reimbursable personal vehicles for a plurality of users, the data including data related to the another parameter and reimbursement rate data for the reimbursable personal vehicles, the processor further configured to (1) access the memory to retrieve the data related to the another parameter and reimbursement rate data for the reimbursable personal vehicle of the user, (2) compute the monetary cost for the reimbursable personal vehicle based on the vehicle travel plan data, the determined distance, and the retrieved reimbursement rate data, and (3) compute the another parameter data value for the reimbursable personal vehicle based on the vehicle travel plan data and the retrieved data related to the another parameter.

35. The system of claim 1 wherein the processor is further configured to (1) compute a monetary cost for a fleet vehicle based on the vehicle travel plan data and the retrieved vehicle travel mode data, the computed monetary cost for the fleet vehicle being associated with a third vehicle travel mode option, the third vehicle travel mode option corresponding to travel by the fleet vehicle from the origin to the destination in accordance with the vehicle travel plan, (2) compute a data value for the another parameter for the fleet vehicle based on the vehicle travel plan data and the retrieved vehicle travel mode data, the computed another parameter data value for the fleet vehicle being associated with the third vehicle travel mode option, (3) compute a normalized cost for the third vehicle travel mode option as a weighted combination of the computed monetary cost and the computed another parameter data value for the fleet vehicle, and (4) make a selection as between the first, second and third vehicle travel mode options according to the vehicle travel mode selection rule based on the computed normalized costs for the first, second and third vehicle travel mode options.

36. The system of claim 35 further comprising a memory for access by the processor, the memory configured to store (1) a plurality of data structures that comprise data about a plurality of reimbursable personal vehicles for a plurality of users, the data including data related to the another parameter and reimbursement rate data for the reimbursable personal vehicles, and (2) a plurality of data structures that comprise data about a plurality of fleet vehicles available to an organization that employs the user, the fleet vehicle data including data related to the another parameter for the fleet vehicles, the processor further configured to (1) access the memory to retrieve the data related to the another parameter and reimbursement rate data for the reimbursable personal vehicle of the user and the fleet vehicle data for at least one of the fleet vehicles, (2) compute the monetary cost for the reimbursable personal vehicle based on the vehicle travel plan data, the determined distance, and the retrieved reimbursement rate data for the reimbursable personal vehicle, (3) compute the another parameter data value for the reimbursable personal vehicle based on the vehicle travel plan data and the retrieved data related to the another parameter for the reimbursable personal vehicle, (4) compute the monetary cost for the at least one fleet vehicle based on the vehicle travel plan data and the retrieved fleet vehicle data for the at least one fleet vehicle, and (5) compute the another parameter data value for the at least one fleet vehicle based on the vehicle travel plan data and the retrieved data related to the another parameter for the at least one fleet vehicle.

37. The system of claim 35 further comprising a memory for access by the processor, the memory configured to store a data value representative of a sunk cost associated with the fleet vehicle travel mode, and wherein the processor is further configured to compute a monetary cost for the fleet vehicle travel mode based at least in part on the associated sunk cost data value.

38. A method for managing vehicle travel, the method comprising:
  receiving data from a user that represents a plan to travel by vehicle, wherein the vehicle travel plan data comprises an origin and a destination;
  determining a distance for the vehicle travel plan based at least in part on the received vehicle travel plan data;
  retrieving vehicle travel mode data for a plurality of vehicle travel modes that satisfy the vehicle travel plan based at least in part on the received vehicle travel plan data;
  computing a monetary cost for a rental vehicle based on the vehicle travel plan data and the retrieved vehicle travel mode data, the computed monetary cost for the rental vehicle being associated with a first vehicle travel mode option, the first vehicle travel mode option corresponding to travel by the rental vehicle from the origin to the destination in accordance with the vehicle travel plan;
  computing a data value for another parameter for the rental vehicle based on the vehicle travel plan data and the retrieved vehicle travel mode data, the another parameter comprising a parameter other than monetary cost, the computed another parameter data value for the rental vehicle being associated with the first vehicle travel mode option;
  computing a normalized cost for the first vehicle travel mode option as a weighted combination of the computed monetary cost and the computed another parameter data value for the rental vehicle;
  computing a monetary cost for a reimbursable personal vehicle based on the vehicle travel plan data, the determined distance, and the retrieved vehicle travel mode data, the computed monetary cost for the reimbursable personal vehicle being associated with a second vehicle travel mode option, the second vehicle travel mode option corresponding to travel by the reimbursable personal vehicle from the origin to the destination in accordance with the vehicle travel plan;
  computing a data value for the another parameter for the reimbursable personal vehicle based on the vehicle travel plan data and the retrieved vehicle travel mode data, the computed another parameter data value for the reimbursable personal vehicle being associated with the second vehicle travel mode option, and
  computing a normalized cost for the second vehicle travel mode option as a weighted combination of the computed monetary cost and the computed another parameter data value for the reimbursable personal vehicle; and making a selection as between the first vehicle travel mode option and the second vehicle travel mode option according to a vehicle travel mode selection rule based on the computed normalized costs for the first and second vehicle travel mode options; and wherein the method steps are performed by a processor.

39. The method of claim 38 wherein the retrieved vehicle travel mode data comprises a reimbursement rate applicable to the reimbursable personal vehicle travel mode and a monetary rental cost associated with the rental vehicle travel mode.

40. The method of claim 39 wherein retrieving step comprises retrieving the monetary rental cost associated with the rental vehicle travel mode by requesting and receiving monetary rental cost data from a reservation booking engine.

41. The method of claim 40 further comprising electronically booking a rental vehicle reservation through the rental vehicle reservation booking engine at least partly in response to the selection of a rental vehicle travel mode.

42. The method of claim 40 wherein the received vehicle travel plan data comprises temporal data for the vehicle travel plan, and wherein the requesting step comprises providing the temporal data to the rental vehicle reservation booking engine for use by the rental vehicle reservation booking engine to determine the monetary rental cost associated with the rental vehicle travel mode.

43. The method of claim 42 wherein the retrieving step further comprises (1) determining a fuel cost rate, and (2) for at least the rental vehicle travel mode, (i) determining data representative of fuel consumption for the rental vehicle as a function of the determined distance, and (ii) determining as part of the monetary rental cost associated with the rental vehicle travel mode a component thereof attributable to fuel costs based on the determined fuel cost rate and the determined fuel consumption data.

44. The method of claim 43 wherein the fuel cost rate determining step comprises accessing an external fuel cost rate data source to determine the fuel cost rate.

45. The method of claim 38 wherein the received vehicle travel plan data further comprises a date and time for the vehicle travel plan.

46. The method of claim 38 wherein the determining step comprises accessing a geographic information system (GIS) to determine the distance based at least in part on the received vehicle travel plan data.

47. The method of claim 38 wherein the processor is in communication with a memory, the method further comprising the following steps performed by the processor: (1) receiving data from a plurality of users that represents a plurality of plans to travel by vehicle, (2) storing the received data for the vehicle travel plans in the memory, and (3) processing the stored data for the vehicle travel plans to identify potential ridesharing opportunities between a plurality of the users.

48. The method of claim 47 wherein the memory is configured to store a plurality of data fields for a plurality of vehicle travel plans, the data fields comprising the origin, the destination, a date, a start time and an end time, and wherein the stored data processing step comprises processing the data fields to identify the potential ridesharing opportunities.

49. The method of claim 48 wherein the stored data processing step further comprises requiring that a potential ridesharing opportunity between different users' travel plans share an exact match in at least one of the group consisting of the origin and destination fields of the different users' travel plans.

50. The method of claim 48 wherein the stored data processing step further comprises permitting proximate matches for a potential ridesharing opportunity with respect to at least one of the group consisting of the origin and destination fields of the different users' travel plans.

51. The method of claim 48 wherein the stored data processing step further comprises requiring that a potential ridesharing opportunity between different users' travel plans share an exact match in the date fields of the different users' travel plans.

52. The method of claim 51 wherein the stored data processing step further comprises permitting proximate matches for a potential ridesharing opportunity with respect to at least one of the group consisting of the start time and end time fields of the different users' travel plans.

53. The method of claim 48 wherein the memory is configured to store a plurality of data values in association with a plurality of the users, wherein the data values are representative of an assessment as to how valuable each associated user's time is, and wherein the stored data processing step further comprises determining the ridesharing opportunities among the users based at least in part upon the stored data values.

54. The method of claim 53 wherein the memory is further configured to store a plurality of user profiles, each user profile associated with a user and configured to store the data value for that user.

55. The method of claim 47 further comprising storing data in association with a plurality of users which controls whether those users are eligible for consideration together as part of a ridesharing opportunity.

56. The method of claim 55 wherein the memory is further configured to store a plurality of user profiles, each user profile associated with a user and configured to store the data that controls the user's eligibility for pairing with other users in a ridesharing opportunity.

57. The method of claim 47 further comprising the processor defining a plurality of designated user groups, each designated user group comprising a plurality of users who are eligible for ridesharing opportunities with each other.

58. The method of claim 47 further comprising the processor (1) receiving data from a user that is indicative of a package that need to be delivered to a destination, and (2) processing the stored data for the vehicle travel plans to identify a potential ridesharing opportunity between at least one user and the package for delivery of the package to the destination.

59. The method of claim 38 further comprising a memory in communication with the processor, wherein the memory is configured to store a user profile associated with the user, and wherein the retrieving step comprises retrieving at least a portion of the vehicle travel mode data from the user profile.

60. The method of claim 59 wherein the user profile is configured to store data representative of a reimbursable personal vehicle travel mode for the user.

61. The method of claim 38 further comprising performing the method steps in response to executing a calendar software application such that the receiving step comprises receiving the vehicle travel plan data in response to user input via a graphical user interface accessed through the calendar software application.

62. The method of claim 38 wherein the available vehicle travel modes further comprise a fleet vehicle travel mode.

63. The method of claim 62 further comprising the processor determining whether a fleet vehicle for the fleet vehicle travel mode is available for use to satisfy the vehicle travel plan, and wherein the vehicle travel mode selection rule is configured to (1) select the fleet vehicle travel mode if a fleet vehicle is determined to be available for use, and (2) if no fleet vehicle is determined to be available for use, select as between the rental vehicle travel mode and the reimbursable personal vehicle travel mode based on the computed normalized costs for the rental vehicle travel mode and the reimbursable personal vehicle travel mode.

64. The method of claim 38 further comprising a memory storing a plurality of data structures that comprise data about a plurality of reimbursable personal vehicles for a plurality of users, the data including data related to the another parameter and reimbursement rate data for the reimbursable personal vehicles, wherein the retrieving step comprises the processor accessing the memory to retrieve the data related to the another parameter and reimbursement rate data for the reimbursable personal vehicle of the user, and wherein the processing step comprises the processor (1) computing the monetary cost for the reimbursable personal vehicle based on the vehicle travel plan data, the determined distance, and the retrieved reimbursement rate data, and (2) computing the another parameter data value for the reimbursable personal vehicle based on the vehicle travel plan data and the retrieved data related to the another parameter.

65. The method of claim 38 wherein the computing steps further comprise the processor (1) computing a monetary cost for a fleet vehicle based on the vehicle travel plan data and the retrieved vehicle travel mode data, the computed monetary cost for the fleet vehicle being associated with a third vehicle travel mode option, the third vehicle travel mode option corresponding to travel by the fleet vehicle from the origin to the destination in accordance with the vehicle travel plan, (2) computing a data value for the another parameter for the fleet vehicle based on the vehicle travel plan data and the retrieved vehicle travel mode data, the computed another parameter data value for the fleet vehicle being associated with the third vehicle travel mode option, and (3) computing a normalized cost for the third vehicle travel mode option as a weighted combination of the computed monetary cost and the computed another parameter data value for the fleet vehicle, and wherein the selection making step comprises the processor making a selection as between the first, second and third vehicle travel mode options according to the vehicle travel mode selection rule based on the computed normalized costs for the first, second and third vehicle travel mode options.

66. The method of claim 65 further comprising a memory storing (1) a plurality of data structures that comprise data about a plurality of reimbursable personal vehicles for a plurality of users, the data including data related to the another parameter and reimbursement rate data for the reimbursable personal vehicles, and (2) a plurality of data structures that comprise data about a plurality of fleet vehicles available to an organization that employs the user, the fleet vehicle data including data related to the another parameter for the fleet vehicles, wherein the retrieving step comprises the processor accessing the memory to retrieve the data related to the another parameter and reimbursement rate data for the reimbursable personal vehicle of the user and the fleet vehicle data for at least one of the fleet vehicles, and wherein the computing steps further comprise the processor (1) computing the monetary cost for the reimbursable personal vehicle based on the vehicle travel plan data, the determined distance, and the retrieved reimbursement rate data for the reimbursable personal vehicle, (2) computing the another parameter data value for the reimbursable personal vehicle based on the vehicle travel plan data and the retrieved data related to the another parameter for the reimbursable personal vehicle, (3) computing the monetary cost for the at least one fleet vehicle based on the vehicle travel plan data and the retrieved fleet vehicle data for the at least one fleet vehicle, and (4) computing the another parameter data value for the at least one fleet vehicle based on the vehicle travel plan data and the retrieved data related to the another parameter for the at least one fleet vehicle.

67. The method of claim 65 wherein the retrieving step comprises the processor retrieving a data value representative of a sunk cost associated with the fleet vehicle travel mode, and wherein the fleet vehicle monetary cost computing step comprises the processor computing a monetary cost for the fleet vehicle travel mode based at least in part on the associated sunk cost data value.

\* \* \* \* \*